United States Patent
Iwai

(10) Patent No.: US 9,955,490 B2
(45) Date of Patent: Apr. 24, 2018

(54) RADIO COMMUNICATION APPARATUS, NETWORK NODE, USER NODE, CORE NETWORK, AND METHODS IMPLEMENTED THEREIN

(71) Applicant: NEC Corporation, Tokyo (JP)

(72) Inventor: Takanori Iwai, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 14/397,285

(22) PCT Filed: Apr. 18, 2013

(86) PCT No.: PCT/JP2013/002641
§ 371 (c)(1),
(2) Date: Oct. 27, 2014

(87) PCT Pub. No.: WO2013/161233
PCT Pub. Date: Oct. 31, 2013

(65) Prior Publication Data
US 2015/0117347 A1    Apr. 30, 2015

(30) Foreign Application Priority Data
Apr. 26, 2012    (JP) .................. 2012-101633

(51) Int. Cl.
*H04W 72/08* (2009.01)
*H04W 76/04* (2009.01)
(Continued)

(52) U.S. Cl.
CPC ......... *H04W 72/087* (2013.01); *H04W 28/24* (2013.01); *H04W 76/025* (2013.01);
(Continued)

(58) Field of Classification Search
None
See application file for complete search history.

(56) References Cited

U.S. PATENT DOCUMENTS

2004/0109455 A1* 6/2004 Jouppi .................. H04W 28/24
370/395.52
2012/0039253 A1* 2/2012 Wang ................ H04W 72/1263
370/328
(Continued)

FOREIGN PATENT DOCUMENTS

WO    WO 2011/087826 A1    7/2011
WO    WO 2011/129098 A1    10/2011

OTHER PUBLICATIONS

Extended European Search Report dated Jan. 18, 2016, by the European Patent Office in counterpart European Patent Application No. 13780983.6.
(Continued)

*Primary Examiner* — Christopher Crutchfield
*Assistant Examiner* — Tito Pham
(74) *Attorney, Agent, or Firm* — Finnegan, Henderson, Farabow, Garrett & Dunner, L.L.P.

(57) ABSTRACT

A radio communication apparatus (11) provides a connection with an external network (17) through a core network (15) and a cellular radio access network (14) to at least one local device (12) that is connected to the radio communication apparatus by means of a personal or local area networking technology. The radio communication apparatus (11) transmits to the core network (15) an additional bearer generation request to request an additional bearer having a QoS parameter corresponding to a first QoS policy applied to a first device (12) in an application layer. The radio communication apparatus (11) uses an additional bearer, configured between the radio communication apparatus (11) and the core network (15) according to the additional bearer generation request, to transmit or receive data packets each containing data which is originated by or destined for the first device (12).

18 Claims, 18 Drawing Sheets

(51) Int. Cl.
*H04W 28/24* (2009.01)
*H04W 76/02* (2009.01)
*H04W 4/00* (2018.01)
*H04W 92/02* (2009.01)

(52) U.S. Cl.
CPC .......... *H04W 76/041* (2013.01); *H04W 4/005* (2013.01); *H04W 92/02* (2013.01)

(56) References Cited

U.S. PATENT DOCUMENTS

2013/0042011 A1    2/2013  Sugizaki et al.
2013/0155964 A1*   6/2013  Miller .................. H04L 47/724
                                                    370/329

OTHER PUBLICATIONS

3GPP TS 23.682, Release 11, V11.0.0, Mar. 2012.
3GPP TS 22.368, Release 11, V11.4.0, Mar. 2012.
3GPP TS 22.368, Release 11, V11.3.0, Sep. 2011.
3GPP TSG-SA WG1 Meeting #52, S1-103317, Release 11, Nov. 2010.
International Search Report dated Jun. 11, 2013 in corresponding PCT International Application.

* cited by examiner

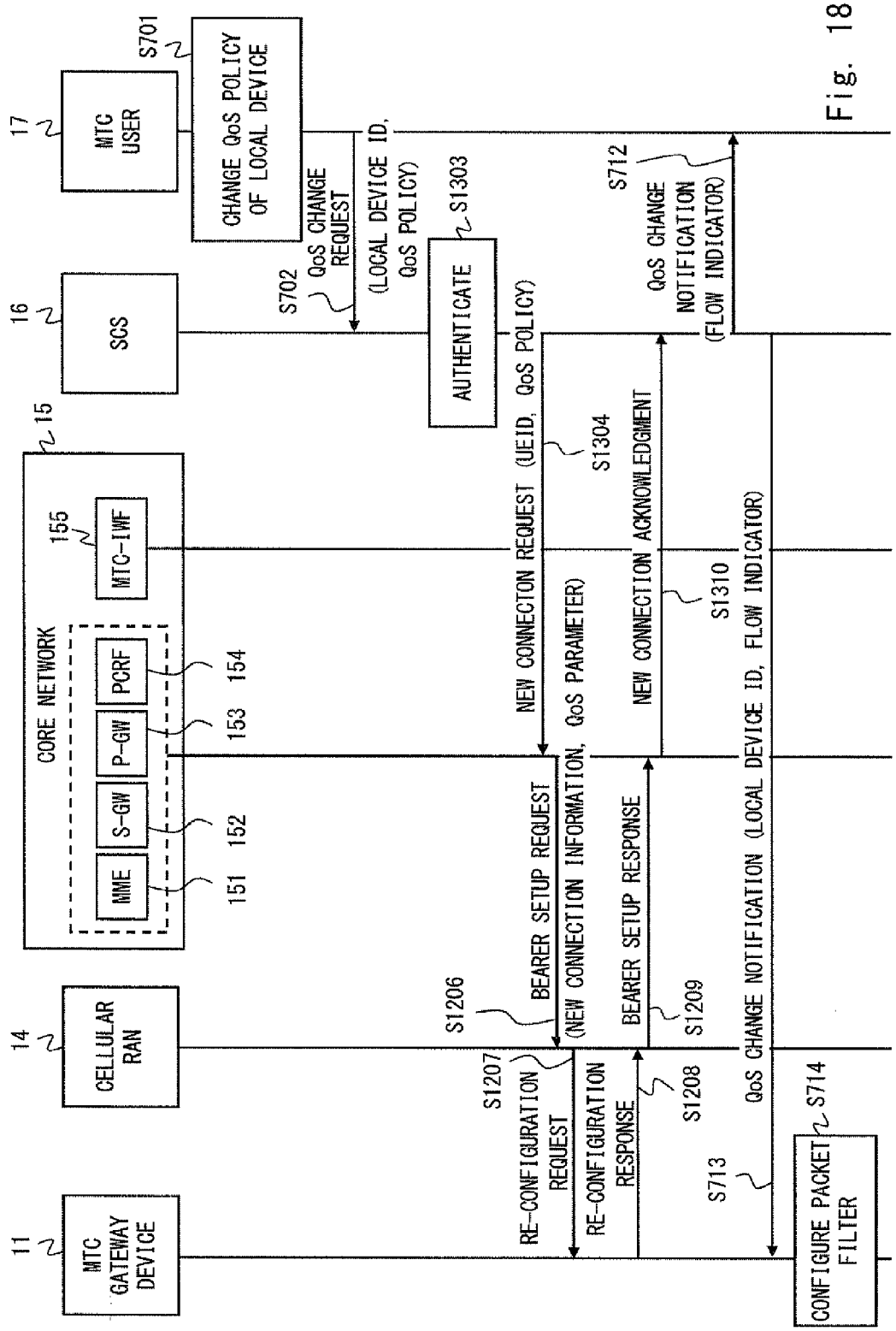

RADIO COMMUNICATION APPARATUS, NETWORK NODE, USER NODE, CORE NETWORK, AND METHODS IMPLEMENTED THEREIN

CROSS-REFERENCE TO RELATED PATENT APPLICATIONS

This application is a National Stage Entry of International Application No. PCT/JP2013/002641, filed Apr. 18, 2013, which claims priority from Japanese Patent Application No. 2012-101633, filed Apr. 26, 2012. The entire contents of the above-referenced applications are expressly incorporated herein by reference.

TECHNICAL FIELD

The present invention relates to a mobile communication system, and for example, to a mobile communication system which uses an MTC gateway device.

BACKGROUND ART

In the 3rd Generation Partnership Project (3GPP), the improvement of a mobile communication system suitable for a machine type communication (MTC) is discussed (see, for example, Non-patent literature 1-3). The MTC is also called a machine-to-machine (M2M) network or a sensor network. When the MTC is implemented in the mobile communication system, a 3GPP communication function (i.e., functions of a mobile station) is typically arranged in a machine (e.g., a vending machine, a gas meter, an electric meter, an automobile, a railway vehicle) or a sensor (e.g., a sensor relating to environment, agriculture, or transportation). The 3GPP defines a mobile station implemented in a machine or a sensor for the MTC as an "MTC device". The MTC device is connected to a core network of a mobile operator through a cellular radio access network (RAN) and communicates with an MTC user. The MTC user is arranged in an external network and has an MTC application. The MTC application implemented in the MTC user communicates with an MTC application implemented in the MTC device. The MTC user is also called an application server (AS).

As disclosed in Non-patent literature 1, the 3GPP defines three models including a direct model, an indirect model, and a hybrid model to achieve an end-to-end communication on an application layer between the MTC device and the MTC use. In the direct model, the MTC user is directly connected to a mobile operator network, thereby performing a direct user plane (data plane) communication with the MTC device.

Meanwhile, in the indirect model, the MTC user is indirectly connected to the mobile operator network through services provided by a services capability server (SCS), thereby performing an indirect user plane communication with the MTC device and using additional services on a control plane (e.g., triggering to the MTC device). In the indirect model, the SCS communicates with the core network and also communicates with the MTC device through the core network. Further, the SCS provides the MTC user with the user plane interface and the data plane interface (e.g., application program interface (API)). The SCS may be referred to as an MTC server, an M2M service platform, an M2M service server, or an MTC service server. It is expected that the SCS is integrally managed with a core network by a mobile operator, or that the SCS is managed by one or more MTC users instead of the mobile operator. In the latter model, the SCS may be coupled to the MTC user. In other words, the function of the SCS may be integrally arranged with the function of the MTC user.

The hybrid model is a model in which the direct model and the indirect model described above are combined. That is, in the hybrid model, the MTC user directly connects to the operator network for the user plane communication with the MTC device and uses the SCS to use additional services on the control plane.

Specific examples of the MTC application includes smart grids, smart meters, remote control of home appliances, remote control of automobiles, electronic and remote medical services. Further, the cellular RAN is, for example, a UMTS terrestrial radio access network (UTRAN) or an evolved UTRAN (E-UTRAN). The core network is, for example, a general packet radio service (GPRS) packet core or an evolved packet core (EPC).

The 3GPP further has discussed, as disclosed in Non-patent literature 2, an introduction of an "MTC gateway device". The MTC gateway device has a 3GPP mobile communication function (i.e., functions of a mobile station) and connects with controlled devices (e.g., sensors, radio frequency identification (RFID) tags, and car navigation devices) by means of a personal or local area networking technology. Specific examples of the personal or local area networking technology include IEEE 802.15, ZigBee, Bluetooth, and IEEE 802.11a. Typically, the controlled devices connected to and controlled by the MTC gateway device do not have the 3GPP mobile communication function. Some or all of the controlled devices connected to the MTC gateway device may, however, have the 3GPP mobile communication function (i.e., MTC device). The MTC gateway device is connected to the core network of the mobile operator through a cellular RAN, and communicates with the MTC user (MTC application) directly or through the SCS. In the above indirect model, a protocol stack model is conceivable in which the SCS terminates the connection with the MTC gateway device. In this case, the controlled devices connected to the MTC gateway device communicate with the MTC user (MTC application) through the SCS.

As will be understood from the above description, it can be considered that the MTC gateway device is one of specific examples of a mobile router (or a user equipment (UE) having a tethering function). That is, the MTC gateway device serves as an agent that provides a connection with an external packet network (e.g., a packet data network (PDN)) through a mobile operator network (i.e., a cellular RAN and a core network) for at least one device that is connected to the MTC gateway device by means of the personal or local area networking technology.

Hereinafter, in this specification, a device located behind the MTC gateway device, the mobile router, or the UE having the tethering function (i.e., a device connected to the MTC gateway device, the mobile router, or the UE having the tethering function by means of the personal or local area networking technology) is called a "local device".

FIGS. 1 to 4 show specific examples of a network architecture regarding the MTC. FIG. 1 shows a specific example of the indirect model. The network architecture shown in FIG. 1 includes an MTC gateway device 91, local devices 92, an SCS 96, and an MTC user (MTC application) 97. The MTC gateway device 91 is connected to the local devices 92 through a personal or local area network 93. The MTC gateway device 91 communicates with the SCS 96 through a mobile operator network (i.e., a cellular RAN 94 and a core network 95). A mobile operator domain 98 indicates a range managed and operated by a mobile operator. In the architecture shown in FIG. 1, the SCS 96 is included in the mobile operator domain 98. As shown in FIG. 2, however, the SCS 96 may be arranged outside of the mobile operator domain 98.

FIG. 3 shows a specific example of the direct model which does not include the SCS 96. In the example shown in FIG. 3, the MTC user 97 performs a direct user plane communication with the core network 95.

FIG. 4 shows a specific example of the hybrid model. In the example shown in FIG. 4, the MTC user 97 is directly connected to the operator network (i.e., core network 95) by a user plane (UP) interface, and is connected to the SCS 96 by a control plane (CP) interface.

The core network 95 shown in FIGS. 1 to 4 has an MTC interworking function (MTC-IWF). The MTC-IWF provides a function which allows the SCS 96 and the control node in the core network to interwork with each other. That is, the MTC-IWF transfers or translates a signaling protocol used for the interface with the SCS to activate the function included in the operator network. The detail of the MTC-IWF is shown, for example, in Non-patent literature 1.

CITATION LIST

Non Patent Literature

[Non-patent literature 1] 3GPP TS 23.682 V11.0.0 (2012-03), "Architecture enhancements to facilitate communications with packet data networks and applications (Release 11)", March 2012
[Non-patent literature 2] 3GPP TS 22.368 V11.3.0 (2011-09), "Service requirements for Machine-Type Communications (MTC); Stage 1; (Release 11)", September 2011
[Non-patent literature 3] 3GPP contribution S1-103317, "Study on Enhancements for MTC; (Release 11)", 3GPP TSG-SA WG1 Meeting #52, La Valletta, Malta, 8-12 Nov. 2010

SUMMARY OF INVENTION

Technical Problem

The present inventor has found the following problems when the MTC gateway device described above is used. A case may be considered, for example, in which a QoS policy in the MTC application layer is changed in order to raise quality-of-service (QoS) level of a local device upon occurrence of failure or the like in the local device. When the MTC gateway device is used, however, the local device cannot be directly recognized from the mobile operator network (i.e., the cellular RAN and the core network). It is therefore difficult to adjust a QoS parameter of a bearer configured between the MTC gateway device and a transfer node in the core network (e.g., a packet data network gateway (P-GW), or a Gateway GPRS Support Node (GGSN)) according to the QoS policy applied to the local device in the MTC application layer. Accordingly, the local device cannot reflect, in the QoS parameter of the bearer, the QoS policy that is requested the local device itself or applied from the MTC user. The QoS parameter of the bearer is, for example, a QoS parameter of an evolved packet system (EPS) bearer including at least one of a QoS class identifier (QCI), an allocation and retention priority (ARP), a guaranteed bit rate (GBR), and a maximum bit rate (MBR).

Further, packet flow control based on the QoS parameter in the mobile operator network is typically performed per bearer basis, which means it is impossible to transmit packets having different QoS parameters on one bearer. Accordingly, when different QoS policies are applied to local devices that are located behind the MTC gateway device, or when a QoS policy applied to a local device is changed, it is desirable that the MTC gateway device is able to configure an additional bearer to which the QoS parameter determined according to the QoS policy of the local device is allocated.

A bearer is a logical communication path to transfer user data packets. For example, an EPS bearer is configured in the evolved packet system (EPS) and a GPRS bearer is configured in a Universal Mobile Telecommunications System (UMTS). The EPS bearer consists of a radio bearer (between UE and an eNB), an S1 bearer (between an eNB and a serving gateway (S-GW)), and an S5/S8 bearer (between an S-GW and a P-GW). The radio bearer is a radio link. The S1 bearer and the S5/S8 bearer are GPRS Tunneling Protocol (GTP) tunnels. User data packets which are transferred through the GTP tunnel are encrypted using a tunneling protocol (e.g., IPsec). In the EPS, one packet data network (PDN) connection is configured for a pair of UE and an Access Point Name (APN), and a plurality of EPS bearers can be configured therein. In short, it is possible to configure a dedicated EPS bearer in addition to the default EPS bearer. Configuration information which describes an EPS bearer is called an EPS bearer context. In the UMTS as well, an additional GPRS bearer may be configured for one PDN connection. Configuration information which describes a GPRS bearer is called a packet data protocol (PDP) context.

The above problem is not limited to the case in which the MTC gateway device is used. The above problem may also occur when, for example, a mobile router (or a user equipment (UE) having a tethering function) is used. In short, the above problem may occur when a radio communication apparatus that is connected to at least one local device by means of a personal or local area networking technology is used.

The present invention has been made based on the perception by the present inventor described above. The present invention aims to provide a radio communication apparatus, a network node, a user node, a core network, and methods and programs implemented therein that contribute to reflecting a new QoS policy that is applied to a local device in an application layer into a QoS parameter of a bearer that is additionally configured by a mobile operator network, when a radio communication apparatus such as an MTC gateway device or a mobile router is used.

Solution to Problem

In a first aspect, a radio communication apparatus includes a controller. The radio communication apparatus provides a connection with an external network through a core network and a cellular radio access network to at least one local device that is connected to the radio communication apparatus by means of a personal or local area networking technology. The controller operates to transmit to the core network an additional bearer generation request to request an additional bearer having a QoS parameter corresponding to a first QoS policy applied to a first device in an application layer. The first device is included in the at least one local device. The controller further operates to use an additional bearer, configured between the MTC gateway device and the core network according to the additional bearer generation request, to transmit or receive data packets each containing data which is originated by or destined for the first device.

In a second aspect, a network node includes a controller. The network node communicates with a radio communication apparatus through a core network and a cellular radio access network. The controller operates to transmit, in response to applying a first QoS policy in an application layer to a first device that is connected to the radio communication apparatus by means of a personal or local area networking technology, a first request indicating the first QoS policy to at least one of the radio communication apparatus and the core network. The first request triggers the at least one of the radio communication apparatus and the core network to configure an additional bearer to which a QoS parameter corresponding to the first QoS policy is allocated.

In a third aspect, a user node includes a controller. The user node communicates with a network node and also communicates with a radio communication apparatus through the network node, a core network, and a cellular radio access network. The controller operates to transmit, in response to applying a first QoS policy in an application layer to a first device that is connected to the radio communication apparatus by means of a personal or local area networking technology, a first request indicating the first QoS policy to at least one of the radio communication apparatus and the core network through the network node. The first request triggers the at least one of the radio communication apparatus and the core network to configure an additional bearer to which a QoS parameter corresponding to the first QoS policy is allocated.

In a fourth aspect, a core network includes at least one core network node that communicates with a radio communication apparatus through a cellular radio access network. The at least one core network node operates to receive a first notification from the radio communication apparatus. The first notification indicates an association of an additional bearer with a first device. The additional bearer is configured between the radio communication apparatus and the core network according to an additional bearer generation request issued by the radio communication apparatus. The first device is included in at least one local device that is connected to the radio communication apparatus by means of a personal or local area networking technology.

In a fifth aspect, a method implemented in a radio communication apparatus is provided. The radio communication apparatus provides a connection with an external network through a core network and a cellular radio access network to at least one local device that is connected to the radio communication apparatus by means of a personal or local area networking technology. The method includes:
(a) transmitting to the core network an additional bearer generation request to request an additional bearer having a QoS parameter corresponding to a first QoS policy applied to a first device in an application layer, the first device being included in the at least one local device; and
(b) using an additional bearer, configured between the radio communication apparatus and the core network according to the additional bearer generation request, to transmit or receive data packets each containing data which is originated by or destined for the first device.

In a sixth aspect, a method implemented in a network node is provided. The network node communicates with a radio communication apparatus through a core network and a cellular radio access network. The method includes transmitting, in response to applying a first QoS policy in an application layer to a first device that is connected to the radio communication apparatus by means of a personal or local area networking technology, a first request indicating the first QoS policy to at least one of the radio communication apparatus and the core network. The first request triggers the at least one of the radio communication apparatus and the core network to configure an additional bearer to which a QoS parameter corresponding to the first QoS policy is allocated.

In a seventh aspect, a method implemented in a user node is provided. The user node communicates with a network node and also communicates with a radio communication apparatus through the network node, a core network, and a cellular radio access network. The method includes transmitting, in response to applying a first QoS policy in an application layer to a first device that is connected to the radio communication apparatus by means of a personal or local area networking technology, a first request indicating the first QoS policy to at least one of the radio communication apparatus and the core network through the network node. The first request triggers the at least one of the radio communication apparatus and the core network to configure an additional bearer to which a QoS parameter corresponding to the first QoS policy is allocated.

In an eighth aspect, a method implemented in a core network node is provided. The core network node communicates with a radio communication apparatus through a cellular radio access network. The method includes receiving a first notification from the radio communication apparatus. The first notification indicates an association of an additional bearer with a first device. The additional bearer is configured between the radio communication apparatus and the core network according to an additional bearer generation request issued by the radio communication apparatus. The first device is included in at least one local device that is connected to the radio communication apparatus by means of a personal or local area networking technology.

In a ninth embodiment, a program for causing a computer to perform the method according to the fifth aspect is provided.

In a tenth embodiment, a program for causing a computer to perform the method according to the sixth aspect is provided.

In an eleventh embodiment, a program for causing a computer to perform the method according to the seventh aspect is provided.

In a twelfth embodiment, a program for causing a computer to perform the method according to the eighth aspect is provided.

Advantageous Effects of Invention

According to aspects stated above, it is possible to provide a radio communication apparatus, a network node, a user node, a core network, and methods and programs implemented therein that contribute to reflecting a new QoS policy applied to a local device in an application layer into a QoS parameter of a bearer that is additionally configured by a mobile operator network, when a radio communication apparatus such as an MTC gateway device or a mobile router is used.

BRIEF DESCRIPTION OF DRAWINGS

FIG. 18 is a sequence diagram showing a third example of the procedure for configuring the additional bearer in the mobile communication network according to the fifth embodiment.

DESCRIPTION OF EMBODIMENTS

Hereinafter, with reference to the drawings, specific embodiments will be described in detail. Throughout the drawings, the same or corresponding components are denoted by the same reference symbols, and the overlapping description will be omitted as appropriate for the sake of clarification of the description.

First Embodiment

Figure 1:
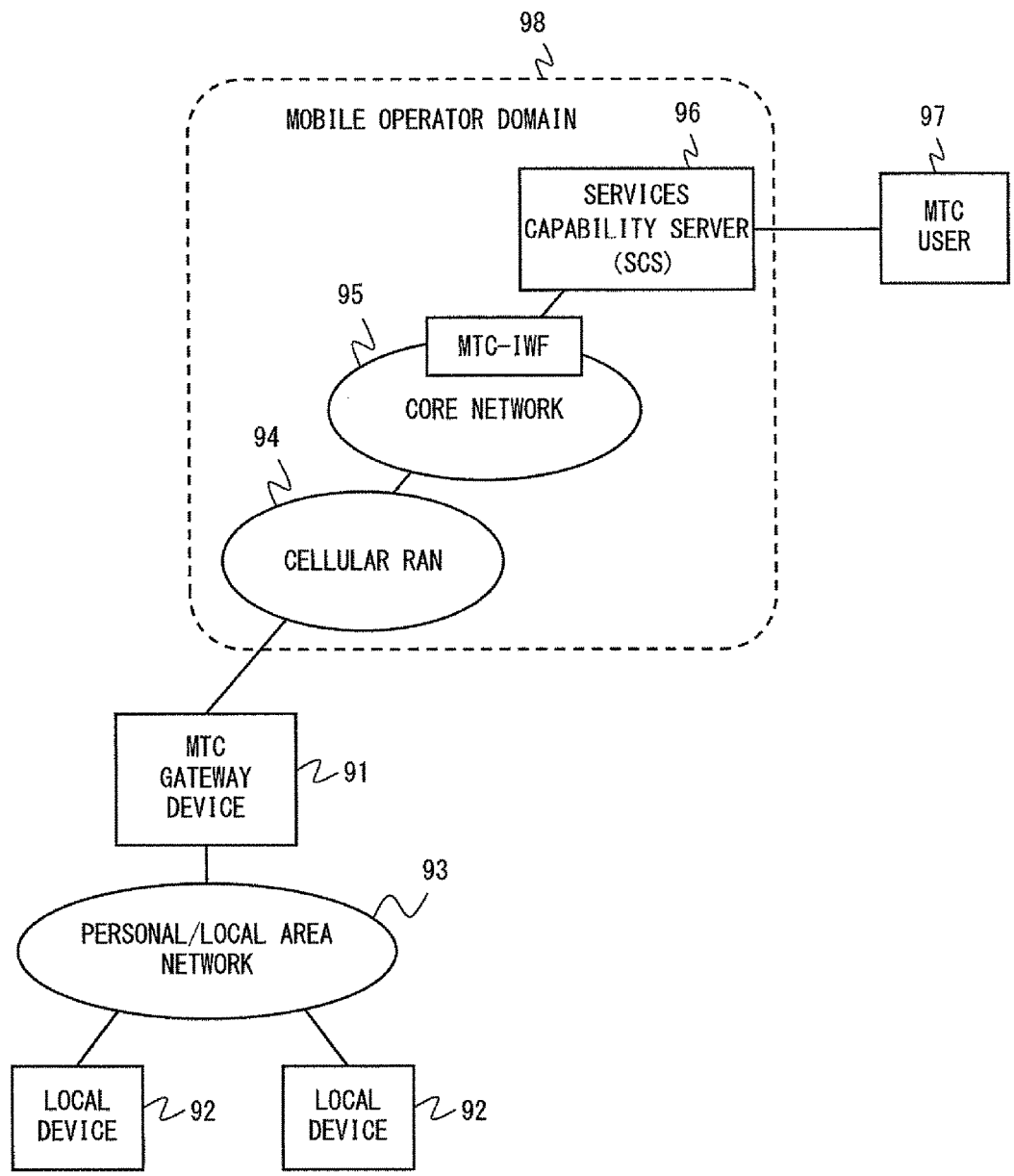
FIG. 1 is a diagram showing one example of a network architecture including an MTC gateway device.
Figure 2:
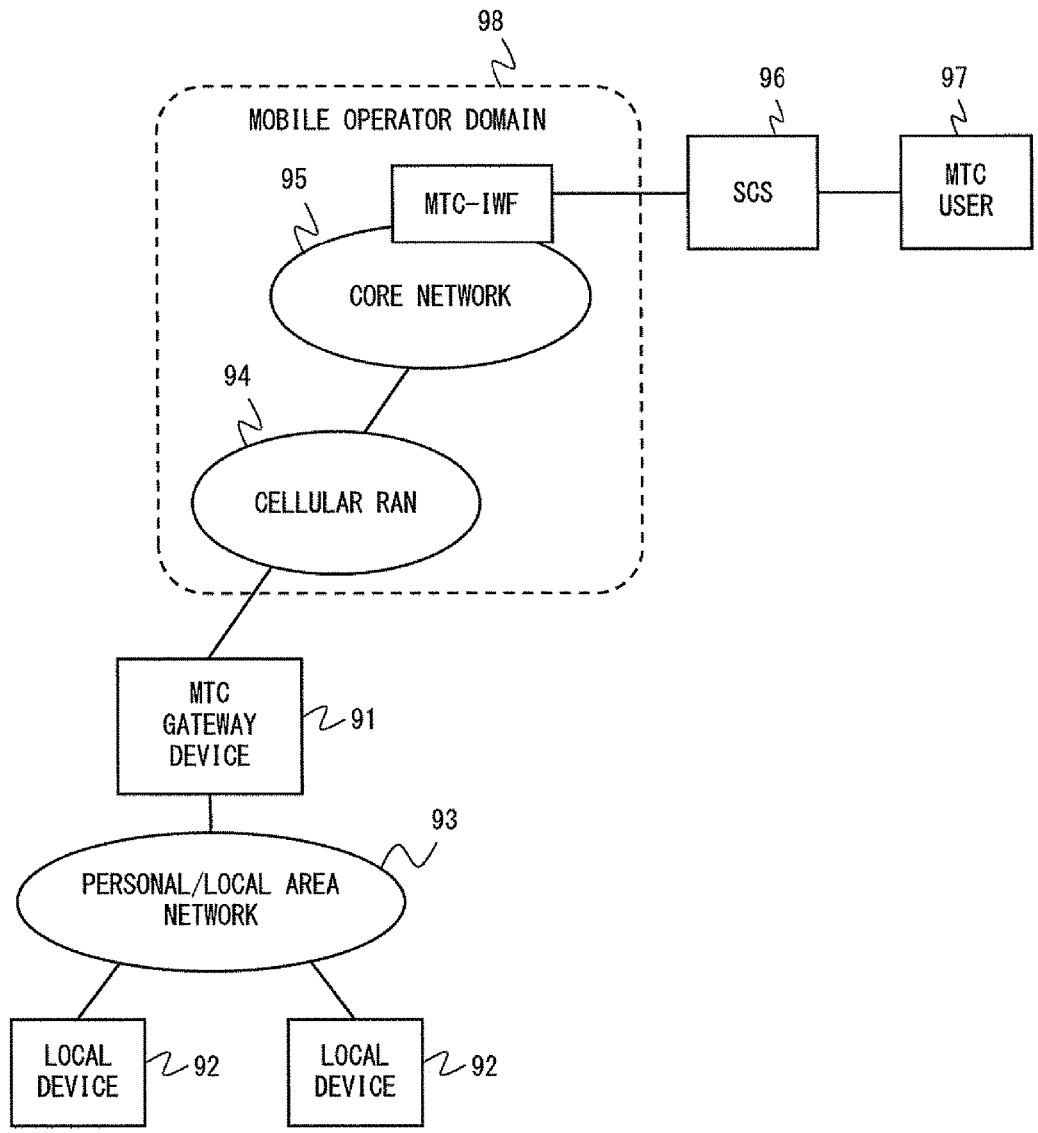
FIG. 2 is a diagram showing another example of the network architecture including the MTC gateway device.
Figure 3:
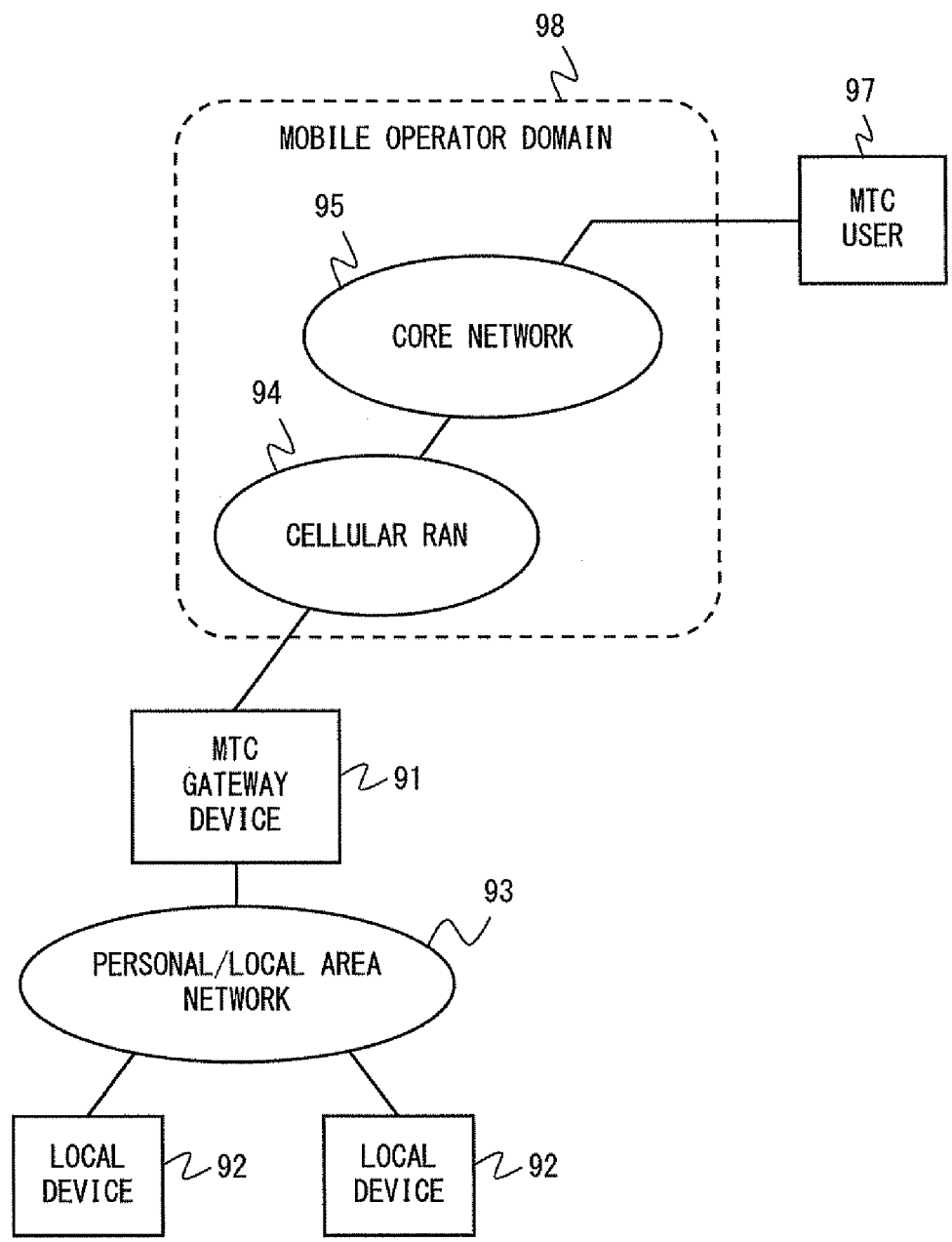
FIG. 3 is a diagram showing another example of the network architecture including the MTC gateway device.
Figure 4:
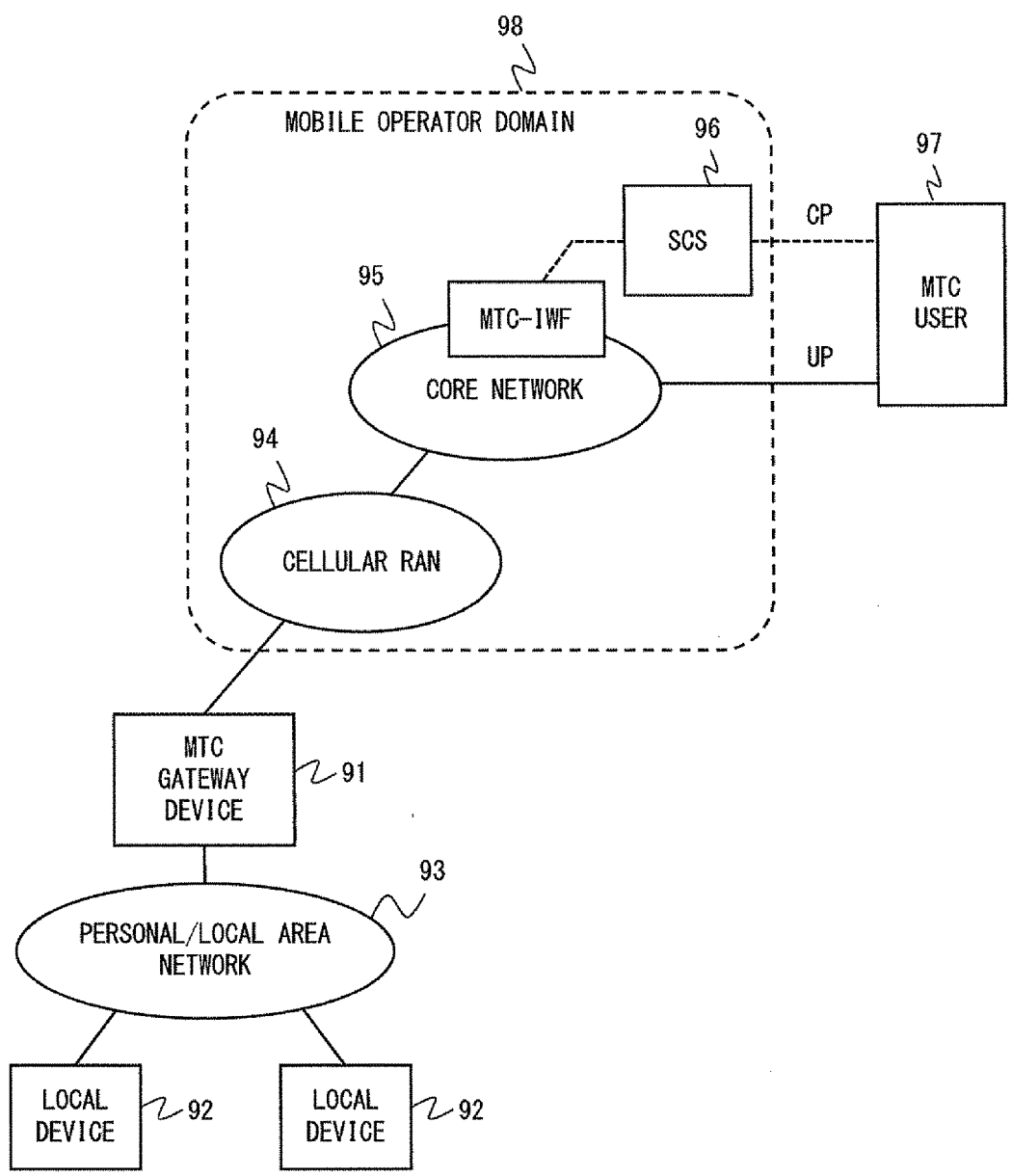
FIG. 4 is a diagram showing another example of the network architecture including the MTC gateway device.
Figure 5:
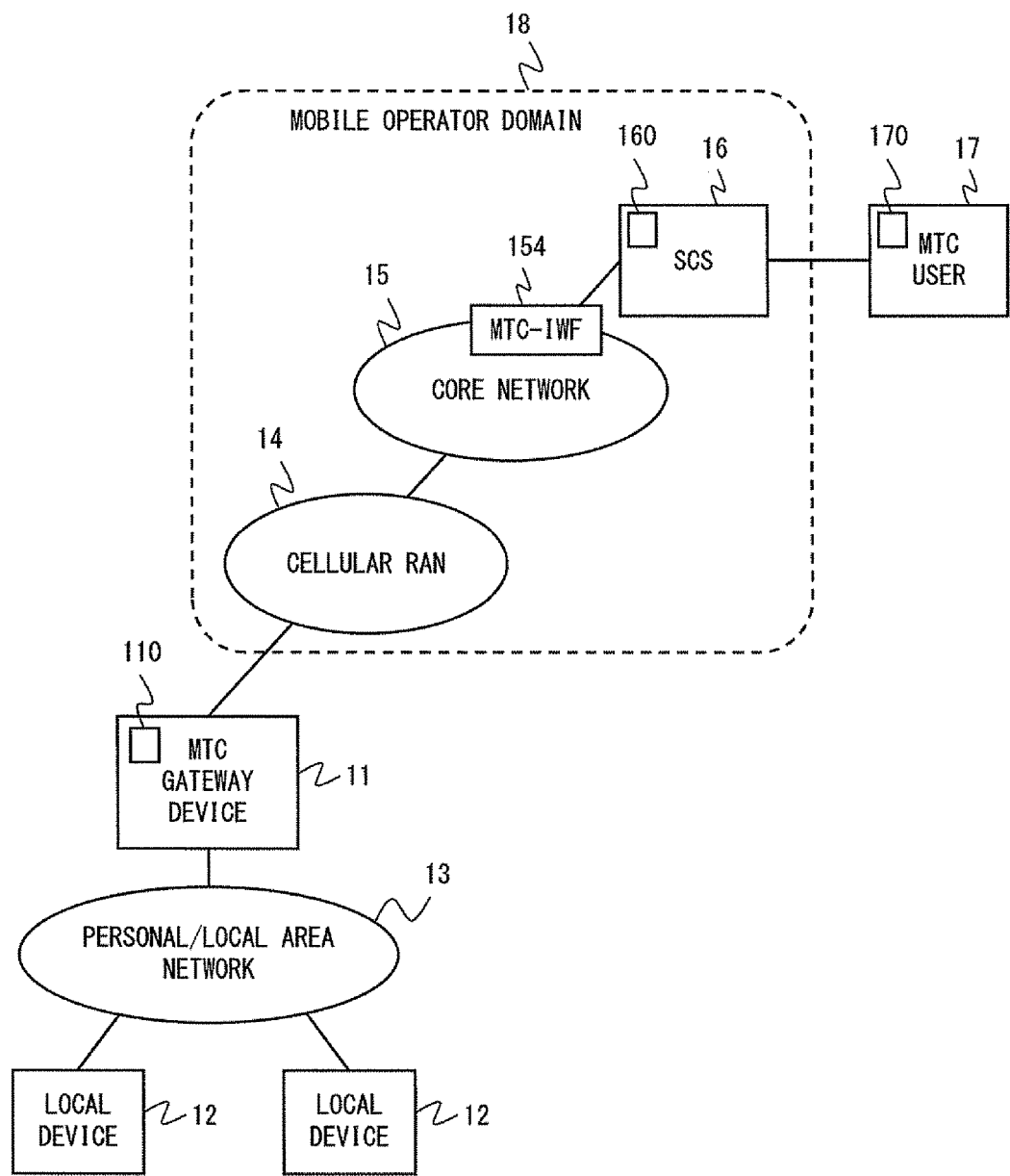
FIG. 5 is a block diagram showing a configuration example of a mobile communication network according to a first embodiment.

FIG. 5 shows a configuration example of a mobile communication network according to this embodiment. While FIG. 5 shows the indirect model described above, the embodiment may be, for example, a hybrid model. The mobile communication network according to this embodiment includes an MTC gateway device 11 and an SCS 16, and provides MTC services for an MTC user 17 and a local device 12. The MTC gateway device 11 provides a connection with an external network (i.e., MTC user 17) through a cellular RAN 14 and a core network 15 for at least one local device 12 that is connected to the MTC gateway device 11 by means of a personal or local area networking technology. In the example shown in FIG. 5, the MTC gateway device 11 communicates with at least one local device 12 through a personal/local area network 13. The MTC gateway device 11 also communicates with the SCS 16 through the cellular RAN 14 and the core network 15. In the example shown in FIG. 5, the SCS 16 is included in a mobile operator domain 18.

The network 13 is a network based on the personal or local area networking technology, and is a network, for example, of IEEE 802.15, ZigBee, Bluetooth, or IEEE 802.11a. The cellular RAN 14 is, for example, E-UTRAN, UTRAN, or a GSM EDGE Radio Access Network (GERAN).

The cellular RAN 14 includes a plurality of base stations (e.g., eNBs or NodeBs) which can be connected to the MTC gateway device 11 as a mobile station with a radio link (radio bearer). The core network 15 is, for example, a GRPS packet core or an EPC.

The core network 15 includes at least one control node and at least one transfer node. The at least one control node executes mobility management, bearer (session) management and the like. The at least one transfer node transfers user data packets between an external network (e.g., a PDN, the SCS 16, or the MTC user 17) and the cellular RAN 14. The at least one control node includes, for example, a control plane function of a Serving GPRS Support Node (SGSN) and a mobility management entity (MME). Further, the at least one transfer node includes, for example, an S-GW, a P-GW, a GGSN, and a user plane function of an SGSN.

Further, the core network 15 includes an MTC-IWF 155. The MTC-IWF 155 provides a function to allow the SCS 16 to interwork with the control node in the core network. The MTC-IWF 155 communicates with, for example, an MME 151, a home subscriber server (HSS) that manages subscriber data, and a charge data function (CDF) that manages charging information.

The SCS 16 is arranged at a boundary of the core network 15 and an external network (i.e., MTC user 17) related to the MTC application. The SCS 16 communicates with the core network 15 and also communicates with the MTC gateway device 11 through the core network 15. Further, the SCS 16 provides the MTC user 17 with an interface (e.g., API) for communicating with the local device 12.

The MTC user 17 executes at least one MTC application to communicate with the SCS 16 through the interface provided by the SCS 16. Accordingly, the MTC user 17 is able to transparently communicate with the local device 12 on the MTC application layer. The MTC user 17 may be, for example, a computer terminal, or may be a server which provides MTC application services to another device.

Depending on the architecture, the MTC gateway device 11 may execute the MTC application. In other words, the MTC gateway device 11 may have a function as the MTC device. In this case, the MTC user 17 is able to transparently communicate with the MTC gateway device 11 in the MTC application layer.

The MTC gateway device 11, the SCS 16, and the MTC user 17 include controllers 110, 160, and 170, respectively. The controllers 110, 160, and 170 execute control that is required to achieve communication on the MTC application layer between the MTC user 17 and the local device 12.

When a new QoS policy different from the QoS policy that has been previously used is applied in the MTC application layer to the local device 12, the controller 110 of the MTC gateway device 11 operates to prepare for an additional bearer having a QoS parameter corresponding to the new QoS policy. To be more specific, the controller 110 performs signaling with the cellular RAN 14 or the core network 15 to configure an additional bearer used for transferring the data packets which are associated with the new QoS policy.

The additional bearer is a bearer that is configured to transfer data packets associated with the new QoS policy in addition to the existing bearer that transfers data packets associated with the existing QoS policy. In the case of the UMTS and the EPS, an example of the additional bearer is a dedicated EPS bearer or a GPRS bearer that is newly added to a PDN connection including at least one existing bearer (i.e., an IP session between the MTC gateway device 11 and the SCS 16). The additional bearer may be generated not by addition of the bearer to the existing PDN connection but by generation of the new PDN connection.

The QoS policy that is applied to the local device 12 in the MTC application layer is determined by the local device 12 itself, the MTC user 17, or the MTC gateway device 11. The QoS policy applied to the local device 12 includes, for example, at least one of a polling interval, a tracking interval, an allowable data rate, a device type, and a priority monitoring level. The priority monitoring level means the priority level among a plurality of local devices. For example, compared to a normal device, a higher priority monitoring level is assigned to a local device where failure or abnormality has been detected. The change of the QoS policy applied to the local device 12 is caused by, for example, periodic or aperiodic changes of the operation mode of the local device 12, occurrence of failure or abnormality in the local device 12, or an operation of the local device 12 by a user (person).

Each of the bearers is a logical communication path that is configured between the MTC gateway device 11 and the core network 15. As described above, each bearer is, for example, an EPS bearer or a GPRS bearer. The QoS parameter of each bearer includes, for example, at least one of a QoS class identifier (QCI), an allocation and retention priority (ARP), a guaranteed bit rate (GBR), and a maximum bit rate (MBR).

Figure 6:
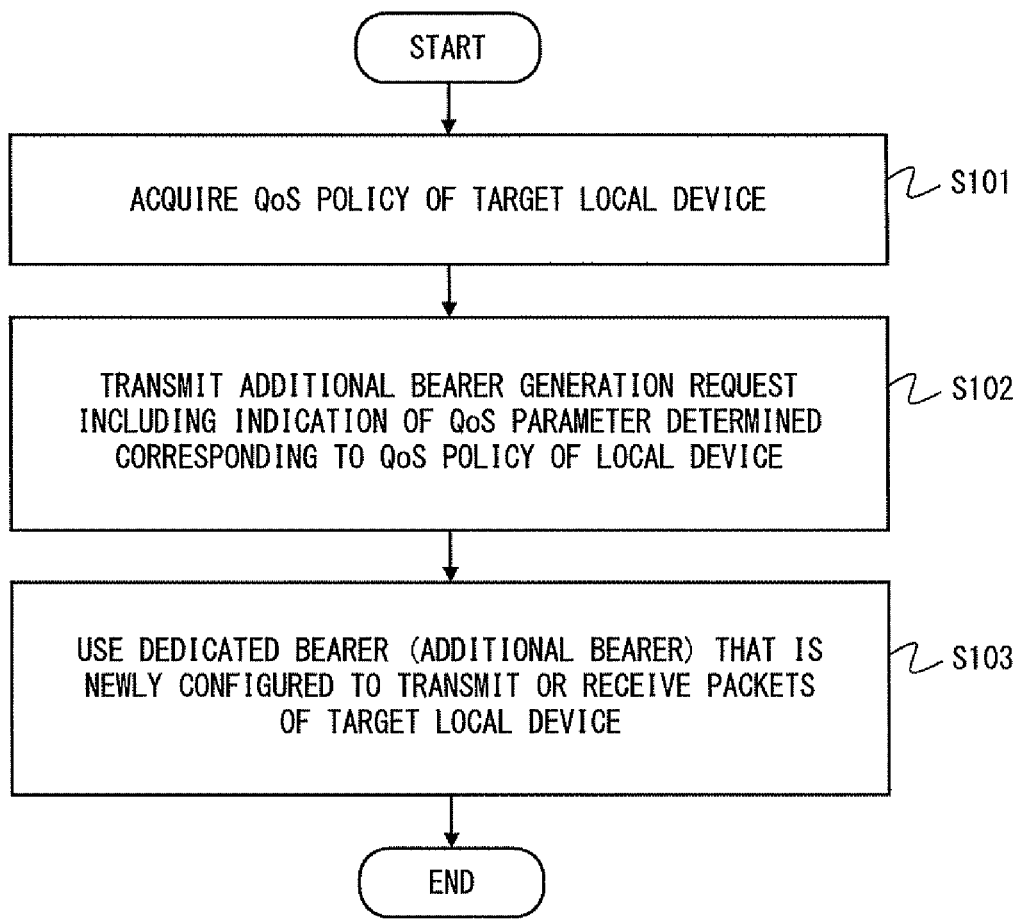
FIG. 6 is a flowchart showing one example of a method implemented in an MTC gateway device according to the first embodiment.

FIG. 6 is a flowchart showing a specific example of a control procedure performed by the controller 110. In Step S101, the controller 110 operates to acquire a QoS policy (hereinafter referred to as a new QoS policy) applied in the MTC application layer to a target local device included in at least one local device 12 connected through the network 13. The acquisition of the new QoS policy by the MTC gateway device 11 may be executed by any of the methods described below.

In one method, the MTC gateway device 11 may acquire the new QoS policy by receiving a new connection request from the target local device. In another method, the MTC gateway device 11 may acquire the new QoS policy by receiving a request for change of existing QoS policy of the target local device which has already been connected to the target local device. Further alternatively, the MTC gateway device 11 may acquire the new QoS policy by receiving a request for change of existing QoS policy of the target local device from the SCS 16 or the MTC user 17. Further alternatively, the MTC gateway device 11 may acquire the new QoS policy by monitoring the target local device which has already been connected thereto (for example, detecting failure or abnormality), and autonomously determining the change of the QoS policy of the target local device.

In Step S102, the controller 110 operates to transmit an additional bearer generation request to the core network 15. The additional bearer generation request requests to configure the additional bearer having the QoS parameter corresponding to the new QoS policy applied to the target local device. The additional bearer generation request may include, for example, indication of the required QoS parameter determined according to the new QoS policy. The MTC gateway device 11 may hold an association between the bearer QoS parameter and the QoS policy applied to the local device 12 in the MTC application layer in advance, or may acquire the association from the SCS 16 or the MTC user 17. Typically, the bearer QoS parameter in which a high communication quality is guaranteed may be associated with the QoS policy corresponding to a high communication quality in the MTC application layer.

The controller 110 may operate to compare the existing QoS policies that have already been applied to the at least one local device 12 with the new QoS policy, and transmit the additional bearer generation request when the new QoS policy is different from the existing QoS policies. This is because, if the new QoS policy is the same as any one of the existing QoS policies, the bearer corresponding to the existing policy may be used.

The control node in the core network 15 (e.g., an MME or a control plane of an SGSN) initiates an additional bearer configuration procedure in response to receiving the additional bearer generation request. The additional bearer configuration procedure includes signaling among the control node in the core network 15 (e.g., an MME or a control plane of an SGSN), the transfer node in the core network 15 (e.g., an S-GW, a P-GW, or a control plane of an SGSN), and the base station in the cellular RAN 14 (e.g., an eNB or a NodeB). The additional bearer configuration procedure according to this embodiment may be similar to the normal procedure specified in the mobile communication network. For example, §5.4.5 "UE requested bearer resource modification" of 3GPP TS 23.401 V11.0.0 may be used.

In Step S103, the controller 110 operates to use the additional bearer (i.e., dedicated bearer), which is configured between the MTC gateway device 11 and the core network 15 according to the additional bearer generation request, to transmit or receive data packets each including data which is originated by or destined for the target local device. The controller 110 may assign the additional bearer to either or both of the packets originated by the target local device and the packets destined for the target local device according to the packet filter rule (e.g., traffic flow template (TFT)) specified by the configuration information of the additional bearer (e.g., an EPS bearer context or a PDP context). When the additional bearer includes a bidirectional communication path, the controller 110 may assign the additional bearer to both of the packets originated by the target local device and the packets destined for the target local device. Meanwhile, when the additional bearer is a unidirectional communication path, the controller 110 may assign the additional bearer to either the packets originated by the target local device or the packets destined for the target local device.

As described above, in this embodiment, the MTC gateway device 11 is configured to acquire the new QoS policy applied to the local device in the MTC application layer, and request the mobile operator network (i.e., the cellular RAN 14 and the core network 15) to configure the additional bearer to which the QoS parameter corresponding to the new QoS policy is allocated. Accordingly, in this embodiment, in response to the application to the target local device in the MTC application layer of a new QoS policy different from the existing QoS policy, which has already been applied to at least one local device 12, the bearer of the mobile operator network having the QoS parameter corresponding to the new QoS policy can be generated. In summary, according to this embodiment, it is possible to reflect the new QoS policy applied to the local device in the MTC application layer into the QoS parameter of the additional bearer that is additionally configured by the mobile operator network.

The MTC gateway device 11 may control the QoS of the communication with the target local device on the private/local area network 13 according to the QoS policy of the target local device. Accordingly, the MTC gateway device 11 is able to control the communication quality of the whole communication path from the local device 12 to the SCS 16 based on the QoS policy in the MTC application layer.

Second Embodiment

Shown in the first embodiment is the example of additionally generating a bearer having the QoS parameter corresponding to the QoS policy newly applied to at least one local device 12 in the MTC application layer. In this embodiment, an example regarding the generation of the additional bearer will be described. More specifically, in this embodiment, an example of generating the additional bearer when the local device 12 newly connects to the MTC gateway device 11 will be described. The configuration of the mobile communication network according to this embodiment may be similar to the configuration example shown in FIG. 5. This embodiment may also be, for example, a hybrid model.

Figure 7:
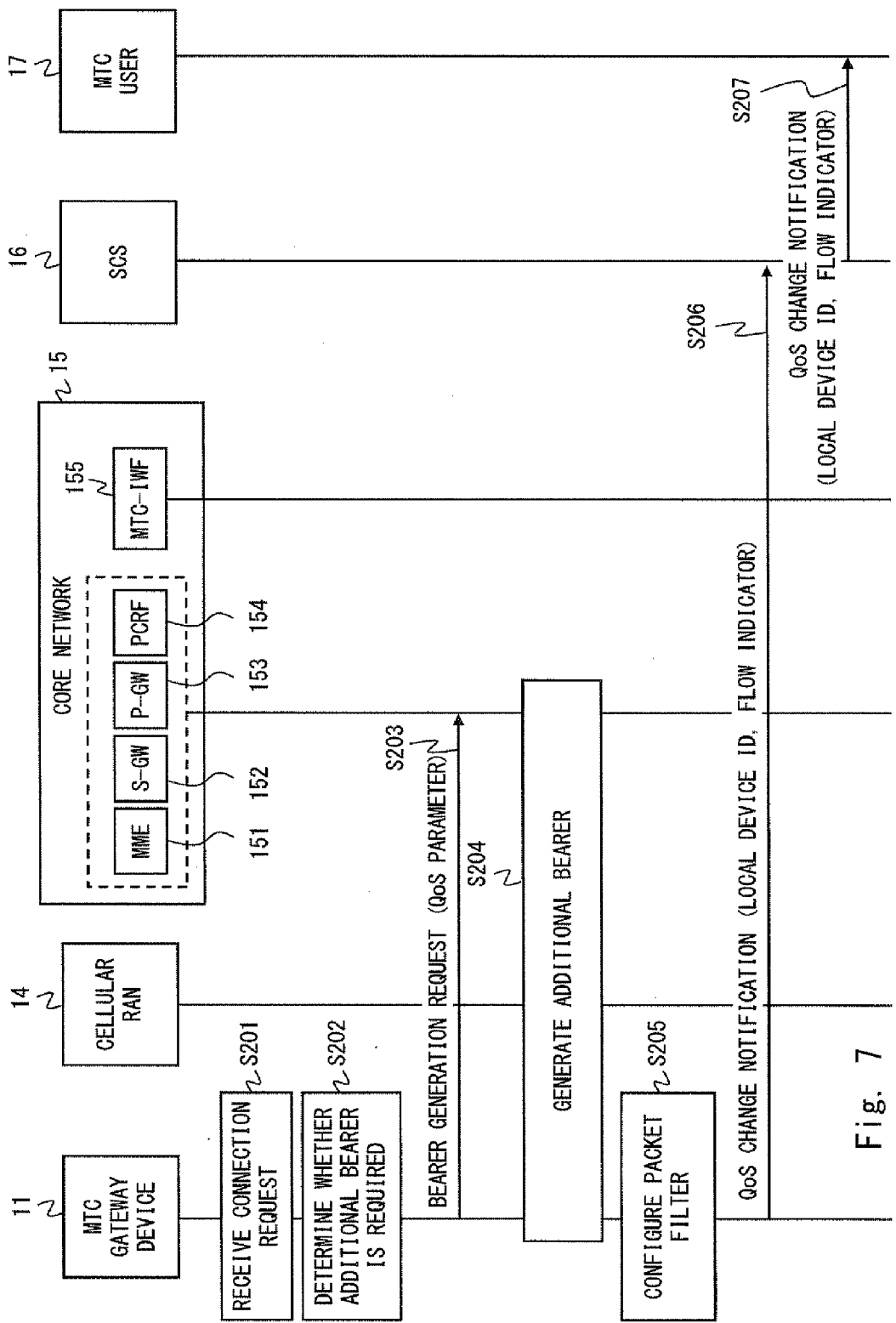
FIG. 7 is a sequence diagram showing one example of a procedure for configuring an additional bearer in a mobile communication network according to a second embodiment.

FIG. 7 shows an example of a procedure for configuring the additional bearer in the mobile communication network according to this embodiment. The example of FIG. 7 is described regarding the EPS, and the core network 15 shown in FIG. 7 includes an MME 151, an S-GW 152, a P-GW 153, a Policy Charging and Rules Function (PCRF) 154, and an MTC interworking function (MTC-IWF) 155. The MTC-IWF 155 communicates with, for example, the MME 151, a home subscriber server (HSS) that manages subscriber data, and a charge data function (CDF) that manages charging information.

In Step S201, the MTC gateway device 11 receives a connection request from the local device 12 (i.e., a target local device). In Step S202, the MTC gateway device 11 acquires a QoS policy of the local device 12 from the received connection request to determine whether an additional dedicated EPS bearer is required or not. For example, the MTC gateway device 11 may determine to request an additional dedicated EPS bearer when the new QoS policy requested by the source local device 12 that originates the connection request is different from the existing QoS policies that have already been applied to the existing local devices 12.

In Step S203, the MTC gateway device 11 transmits to the core network 15 a request for generation of the additional dedicated EPS bearer. The bearer generation request may be a non-access stratum (NAS) message that is transparently transferred from the MTC gateway device 11 as a mobile station to a control node (i.e., the MME 151) of the core network. The bearer generation request may be, for example, a "Request Bearer Resource Modification" message specified in §5.4.5 "UE requested bearer resource modification" of 3GPP TS 23.401 v11.0.0.

In Step S204, according to the request for generation of the additional dedicated EPS bearer, the core network 15, the cellular RAN 14, and the MTC gateway device 11 perform signaling regarding the procedure for generating the additional dedicated EPS bearer. This signaling is specified, for example, in §5.4.5 "UE requested bearer resource modification" of 3GPP TS 23.401 V11.0.0. As a result, the additional dedicated EPS bearer is configured between the MTC gateway device 11 and the core network 15, more specifically, between the MTC gateway device 11 and the P-GW 153 that is associated with the SCS 16.

In Step S205, the MTC gateway device 11 associates the newly-configured additional dedicated EPS bearer with the target local device. More specifically, the MTC gateway device 11 may configure a packet filter so that the data packet flows transmitted and received by the target local device are mapped to the additional dedicated EPS bearer.

In Step S206, the MTC gateway device 11 transmits a QoS change notification to the SCS 16 to notify the association between the additional dedicated EPS bearer and the target local device. The QoS change notification may be a message on the MTC application layer or the session layer (the IP layer), which is transparently transferred from the MTC gateway device 11 to the SCS 16. The QoS change notification may include a flow indicator and a local device identifier (ID) indicating the target local device 12. The flow indicator includes information indicating the data packet flow transmitted or received by the target local device 12. The flow indicator includes, for example, at least one of (i) a bearer identifier, (ii) a port number, (iii) a protocol number, (iv) a Type of Service (TOS) field, (v) a source address, and (vi) a destination address that are contained in the header of the data packet to be distributed to the additional dedicated EPS bearer.

In Step S207, the SCS 16 transmits the QoS change notification including the flow indicator and the local device ID to the MTC user 17. The SCS 16 may execute a packet inspection on the data packets received from the MTC user 17. The SCS 16 may perform header adjustment including rewriting of the packet header so that the data packet destined for the target local device is distributed to the additional dedicated EPS bearer by the core network 15 (i.e., P-GW 153). In this case, the QoS change notification to the MTC user 17 in Step S207 may be omitted. Alternatively, the QoS change notification to the MTC user 17 in Step S207 may only indicate the QoS change of the target local device.

Figure 8:
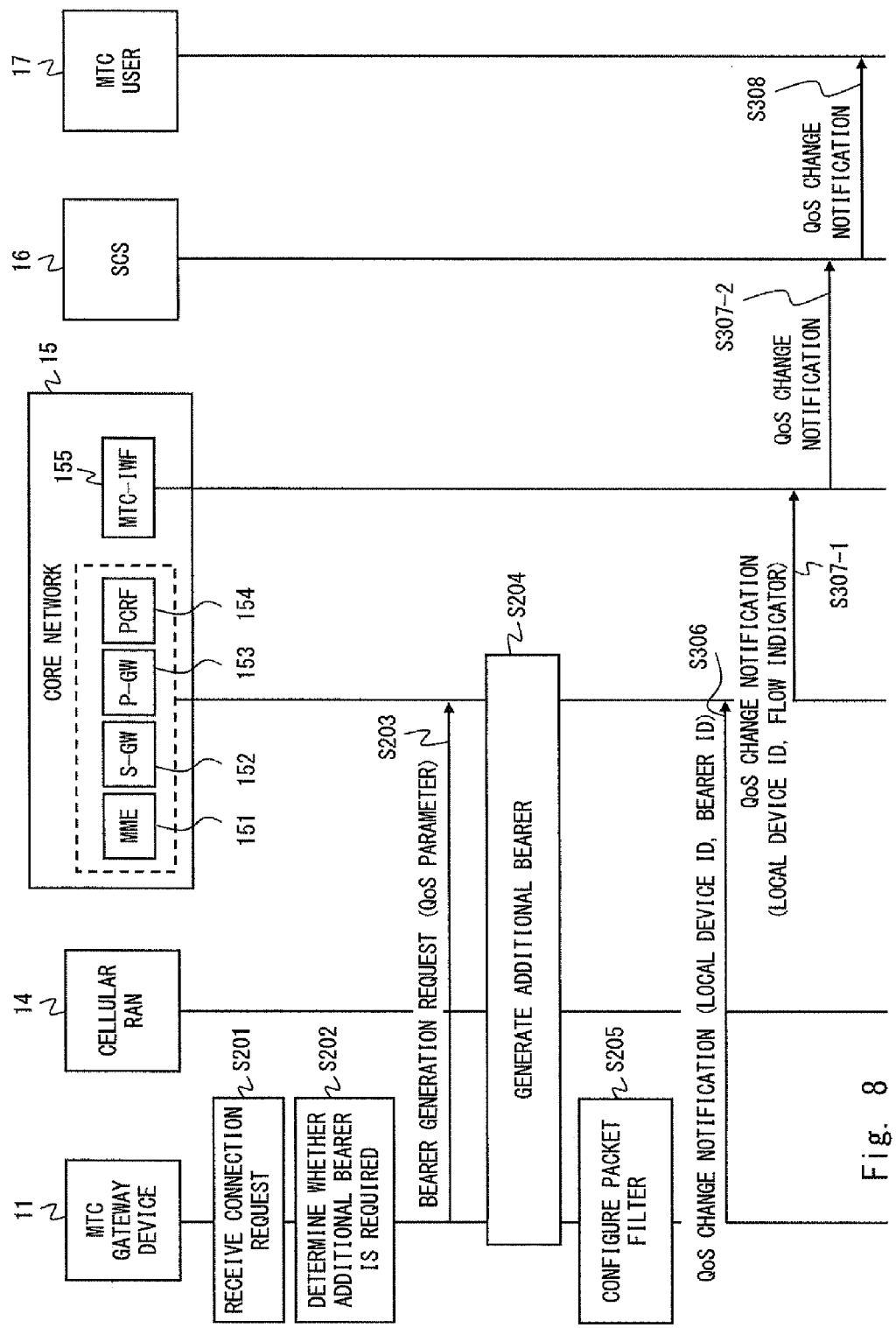
FIG. 8 is a sequence diagram showing another example of a procedure for configuring the additional bearer in the mobile communication network according to the second embodiment.

FIG. 8 shows another example of a procedure for configuring the additional bearer in the mobile communication network according to this embodiment. The processing in Steps S201-S205 shown in FIG. 8 may be similar to the processing in the corresponding steps shown in FIG. 7. In the example shown in FIG. 8, as shown in Steps S306-S308, the QoS change notification from the MTC gateway device 11 is transmitted to the SCS 16 through the core network 15 (e.g., the MME 151 or the P-GW 153).

In Step S306, the MTC gateway device 11 transmits the QoS change notification including the identifier (ID) of the additional dedicated EPS bearer and the local device ID to the core network 15. The MTC gateway device 11 may transmit the QoS change notification to, for example, the MME 151. The ID of the dedicated EPS bearer may be, for example, an "EPS Bearer Identity" which is known by both the MTC gateway device 11 and the core network 15 to identify each dedicated EPS bearer.

In Step S307 (Steps S307-1 and S307-2), the core network 15 (e.g., the MME 151) transmits the QoS change notification including the flow indicator to the SCS 16 through the MTC-IWF 155 based on the configuration of the packet filter applied to the ID of the additional dedicated EPS bearer by the P-GW 153. The flow indicator is information indicating the data packet flows to be distributed to the additional dedicated EPS bearer by the packet filter in the P-GW 153. The flow indicator includes, for example, at least one of (i) a bearer identifier, (ii) a port number, (iii) a protocol number, (iv) a Type of Service (TOS) field, (v) a source address, and (vi) a destination address that are contained in the header of the data packet to be distributed by the P-GW 153 to the additional dedicated EPS bearer.

In Step S308, the SCS 16 transmits the QoS change notification including the flow indicator and the local device ID to the MTC user 17. Similarly to Step S207 in FIG. 7 stated above, Step S308 may be omitted.

As described above, in this embodiment, the MTC gateway device 11 is configured to request the additional bearer in response to the detection of the new connection of the local device 12. Accordingly, the MTC gateway device 11 according to this embodiment is able to support the connection of the plurality of local devices 12 having different QoS policies, and to prepare the dedicated additional bearers according to respective QoS policies of the plurality of local devices 12.

Further, in the specific examples described in this embodiment (FIG. 7 and FIG. 8), the MTC gateway device 11 is configured to transmit, to the SCS 16 or the MTC user 17 directly or indirectly, the notification including the flow indicator indicating data packets that are transferred through the additional bearer. Accordingly, the SCS 16 or the MTC user 17 is able to appropriately use the additional bearer, which is configured at the initiative of the MTC gateway device 11, for the target local device.

Further, in the specific examples described in this embodiment (FIG. 7 and FIG. 8), the MTC gateway device 11 is configured to determine whether an additional bearer is required. Accordingly, the MTC gateway device 11 is able to operate to generate no additional bearer when, for example, the local device 12 that is newly connected to the MTC gateway device 11 requests the same QoS policy as that already applied to the existing device 12. It is therefore possible to suppress an increase in the load of the mobile communication network due to an increase in the number of additional bearers.

Third Embodiment

In this embodiment, another example of generating the additional bearer described in the first embodiment will be described. More specifically, in this embodiment, an example in which generation of an additional bearer is performed in response to a request from the MTC user 17 will be described. The configuration of the mobile communication network according to this embodiment may be similar to the configuration example shown in FIG. 5. This embodiment may also be, for example, a hybrid model.

In this embodiment, the controller 160 of the SCS 16 operates to transmit a QoS change request to the MTC gateway device 11 (or the core network 15) in response to the change of the QoS policy applied to the local device 12 (i.e., the target local device) in the MTC application layer. The QoS change request indicates the new QoS policy applied to the target local device. Further, the QoS change request triggers the MTC gateway device 11 to configure the additional bearer to which the QoS parameter corresponding to the new QoS policy is allocated. In summary, similar to the description in the first or the second embodiment, the MTC gateway device 11 requests the core network 15 to configure an additional bearer in response to reception of the QoS change request.

The SCS 16 may transmit the above-mentioned QoS change request to the MTC gateway device 11 in response to receiving from the MTC user 17 a QoS change request indicating the new QoS policy applied to the target local device. In this case, the controller 170 of the MTC user 17 operates to transmit the QoS change request to the SCS 16. The QoS change request from the controller 170 is transmitted to the MTC gateway device 11 through the SCS 16 and then triggers the MTC gateway device 11 to configure the additional bearer having the QoS parameter corresponding to the new QoS policy.

Figure 9:
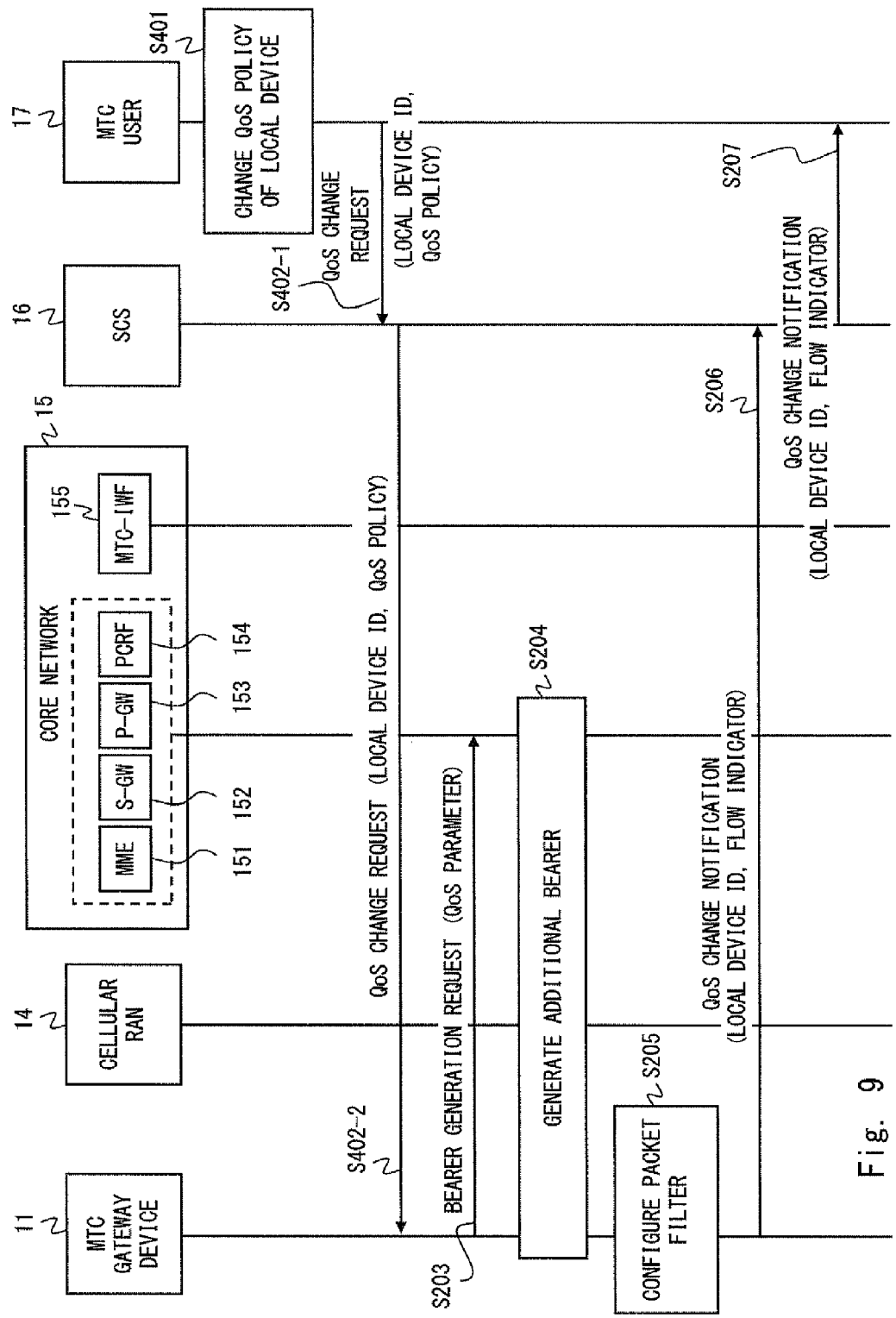
FIG. 9 is a sequence diagram showing a first example of a procedure for configuring an additional bearer in a mobile communication network according to a third embodiment.

FIG. 9 shows a first example of the procedure for configuring the additional bearer in the mobile communication network according to this embodiment. The example shown in FIG. 9 is described regarding the EPS, as is similar to FIGS. 7 and 8. In Step S401, the MTC user 17 determines to change the QoS policy of the local device 12 (i.e., the target local device). In Step S402-1, the MTC user 17 transmits the QoS change request to the SCS 16. The QoS change request includes indication of the new QoS policy and the device ID indicating the target local device.

In Step S402-2, the SCS 16 transfers the QoS change request to the MTC gateway device 11. The QoS change request may be a message on the MTC application layer or the session layer (the IP layer), which is transparently transferred to the MTC gateway device 11 from the SCS 16. Upon receiving the QoS change request, the MTC gateway device 11 transmits a bearer generation request to the core network 15 to generate an additional bearer (Step S203). Accordingly, the procedure for generating the additional dedicated EPS bearer is initiated. The processing in Steps S203-S207 in FIG. 9 may be similar to the processing in the corresponding steps shown in FIG. 7.

Figure 10:
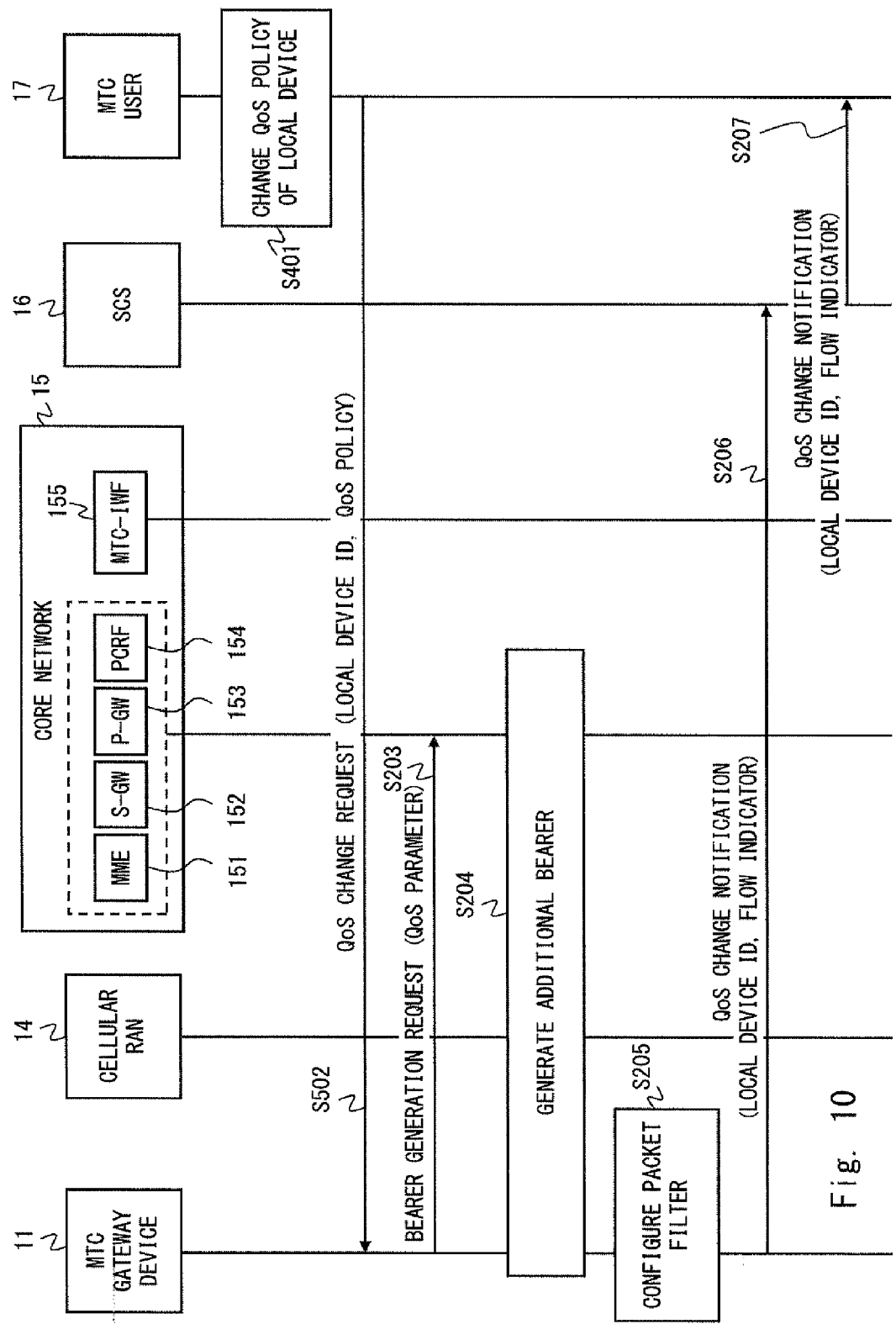
FIG. 10 is a sequence diagram showing a second example of the procedure for configuring the additional bearer in the mobile communication network according to the third embodiment.

FIG. 10 shows a second example of the procedure for configuring the additional bearer in the mobile communication network according to this embodiment. As already stated above, the MTC gateway device 11 may have a MTC application layer function. In this case, the MTC gateway device 11 may transparently communicate with the MTC user 17 on the MTC application layer. In the example shown in FIG. 10, the MTC user 17 transmits the QoS change request as an MTC application layer message to the MTC gateway device 11 (Step S502). The processing in Step S401 and Steps S203-S207 shown in FIG. 10 may be similar to the processing in the corresponding steps shown in FIG. 9 and FIG. 7.

Figure 11:
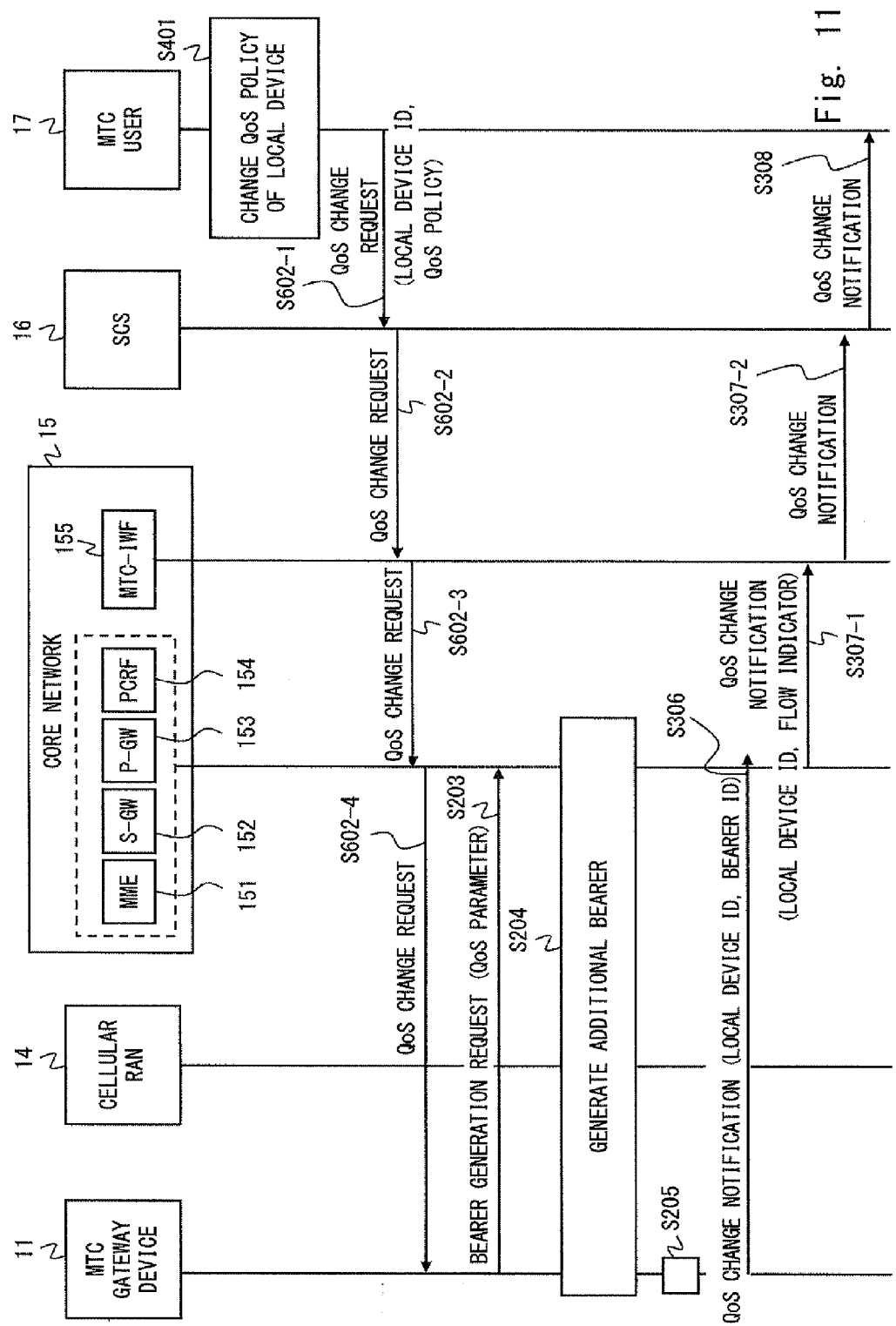
FIG. 11 is a sequence diagram showing a third example of the procedure for configuring the additional bearer in the mobile communication network according to the third embodiment.

FIG. 11 shows a third example of the procedure for configuring the additional bearer in the mobile communication network according to this embodiment. In Step S602-1, as is similar to Step S402-1 shown in FIG. 9, the MTC user 17 transmits the QoS change request to the SCS 16. In Steps S602-2 and S603-3, the SCS 16 transmits the QoS change request to the control node (e.g., the MME 151) arranged in the core network 15 through the MTC-IWF 155. The core network 15 transmits the QoS change request to the MTC gateway device 11 using a message (i.e., a NAS message) transparently transferred to the MTC gateway device 11. The processing in Step S401, Steps S203-S205, and Steps S306-

S308 in FIG. 11 may be similar to the processing in the corresponding steps shown in FIG. 9, FIG. 7, and FIG. 8.

In the example shown in FIGS. 9-11, the MTC gateway device 11 may determine whether it is required to configure the additional bearer in response to the QoS change request. More specifically, the MTC gateway device 11 determines whether a bearer having the QoS parameter corresponding to the QoS policy indicated by the QoS change request has already been configured. When the bearer has already been configured, the MTC gateway device 11 may determine whether this existing bearer can be used to transfer the data flow regarding the target local device. The MTC gateway device 11 may transmit a request for generation of the new additional bearer to the core network 15 when the existing bearer cannot be used.

As described above, in this embodiment, the SCS 16 or the MTC user 17 is configured to trigger the MTC gateway device 11 to configure the additional bearer in response to the change of the QoS policy of the local device 12. Accordingly, in this embodiment, the SCS 16 or the MTC user 17 can initiate the configuration process of the additional bearer in response to the QoS change in the MTC service layer. In summary, in this embodiment, the SCS 16 or the MTC user 17 can control the communication quality of the mobile operator network (i.e., the cellular RAN 14 and the core network 15) interposed between the MTC gateway device 11 and the SCS 16.

The SCS 16 or the MTC user 17 may control the change of the QoS applied to the communication in the private/local area network 13 between the MTC gateway device 11 and the target local device, according to the change of the QoS policy of the target local device. More specifically, the MTC gateway device 11 may adjust the QoS of the private/local area network 13 in response to the reception of the QoS change request from the SCS 16 or the MTC user 17. Accordingly, the SCS 16 or the MTC user 17 is able to control the communication quality in the whole communication path from the local device 12 to the SCS 16 based on the QoS policy in the MTC application layer.

Fourth Embodiment

Described in the first to the third embodiments is the example in which the core network 15 generates an additional bearer in response to the bearer generation request transmitted from the MTC gateway device 11 as a mobile station. Meanwhile, in this embodiment, an example in which the core network 15 prepares the bearer in response to the request from the MTC user 17 as the external network (e.g., a PDN) will be described. The MTC gateway device 11 as a mobile station does not transmit the bearer generation request, but receives from the core network 15 a reconfiguration request corresponding to the additional bearer. The configuration of the mobile communication network according to this embodiment may be similar to the configuration example shown in FIG. 5. This embodiment may also be, for example, a hybrid model.

Figure 12:
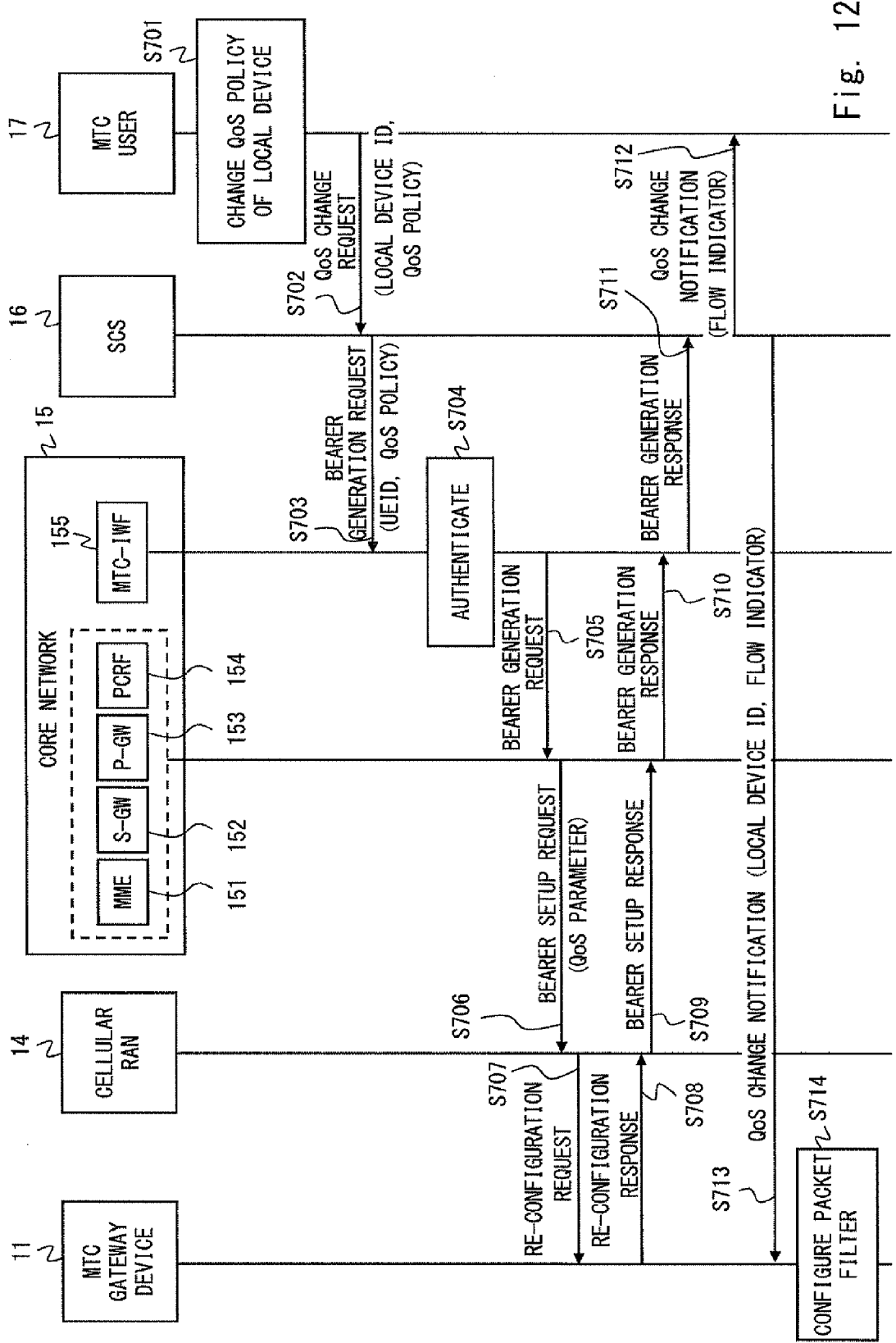
FIG. 12 is a sequence diagram showing a first example of a procedure for configuring an additional bearer in a mobile communication network according to a fourth embodiment.

FIG. 12 shows a first example of the procedure for configuring the additional bearer in the mobile communication network according to this embodiment. The example shown in FIG. 12 is, as is similar to FIGS. 7-11, described regarding the EPS. In Step S701, the MTC user 17 (the controller 170) determines the change of the QoS policy of the local device 12 (i.e., the target local device). In Step S702, the MTC user 17 transmits the QoS change request to the SCS 16. This QoS change request includes indication of the new QoS policy and a device ID indicating the target local device.

In Step S703, the SCS 16 (the controller 160) determines whether an additional bearer is required according to the QoS change request from the MTC user 17. When it is determined that the additional bearer is required, the SCS 16 transmits the bearer generation request to the MTC-IWF 155. The bearer generation request requests the core network 15 to configure the additional bearer (i.e., a dedicated EPS bearer).

The MTC-IWF 155 authenticates whether the SCS 16 is authorized to request the additional bearer configuration (Step S704). The MTC-IWF 155 may perform the authentication in collaboration with another node (e.g., a policy server or the PCRF 154).

When it is authenticated that the SCS 16 has proper authority, the MTC-IWF 155 transfers the bearer generation request to a node in the core network 15 (Step S705). The MTC-IWF 155 may transmit the bearer generation request to, for example, the P-GW 153 that manages end points of bearers. The MTC-IWF 155 may transmit the bearer generation request to the MME 151. The bearer generation request includes an identifier (UEID) of the MTC gateway device 11 as a mobile station and indication of the QoS policy in the MTC application layer. The identifier (UEID) of the MTC gateway device 11 is, for example, International Mobile Subscriber Identity (IMSI).

The node in the core network 15 (e.g., the P-GW 153) may assign the QoS policy, which is specified by the bearer generation request from the SCS 16, to the QoS of the additional dedicated EPS bearer. That is, the core network 15 (e.g., the P-GW 153) may set values corresponding to the QoS policy, which is specified by the bearer generation request, to a QoS parameter (e.g., QCI, ARP, GBR, MBR) of the dedicated EPS bearer. Further, the P-GW 153 may transmit the bearer generation request (a Create Bearer Request) to the S-GW 152. This request includes, for example, the QoS parameter of the dedicated EPS bearer to be generated, an UEID (e.g., an IMSI), a P-GW bearer end point ID (e.g., an S5/S8 Tunnel End Point Identifier (TEID)), and packet filter configuration (e.g., a TFT). The S-GW 152 may transmit the bearer generation request (the Create Bearer Request) to the MME 151 in response to the reception of the bearer generation request (the Create Bearer Request) from the P-GW 153. This request includes, for example, the QoS parameter of the dedicated EPS bearer, the UEID (e.g., an IMSI), the P-GW bearer end point ID (e.g., an S5/S8 TEID), the S-GW bearer end point ID (e.g., an S1-TEID), and the packet filter configuration (e.g., a TFT).

In Step S706, the core network 15 (e.g., the MME 151) transmits a bearer setup request to the cellular RAN 14. For example, the MME 151 may generate a new EPS bearer ID and then transmits the bearer setup request to a radio resource management entity (e.g., an eNB) in the cellular RAN 14. The bearer setup request may include, as the information transmitted to the mobile station, session management information including the QoS parameter of the EPS bearer and packet filter configuration (e.g., a TFT). More specifically, the bearer setup request may include a Session Management Request message specified in §5.4.1 "Dedicated bearer activation" of 3GPP TS 23.401 V11.0.0. The radio resource management entity (e.g., an eNB) in the cellular RAN 14 maps the QoS parameter of the dedicated EPS bearer to the QoS of the radio bearer.

In Step S707, the radio resource management entity (e.g., an eNB) in the cellular RAN 14 transmits a reconfiguration request (e.g., an RRC Connection Reconfiguration message) to the MTC gateway device 11 as a mobile station. The MTC gateway device 11 performs a radio bearer configuration according to the reconfiguration request, and adjusts the packet filter (e.g., a TFT) to map the data packet flow to the radio bearer.

In Steps S708-S711, the response to the request in Steps S703 and S705-S707 is transmitted. More specifically, in Step S711, the SCS 16 (the controller 160) receives the bearer generation response transmitted from the core network 15 (e.g., the MTC-IWF 155) as a reply to the bearer generation request in Step S703. The response includes the flow indicator to identify data packets that are transferred through the additional dedicated EPS bearer. The flow indicator includes, for example, at least one of (i) a bearer identifier, (ii) a port number, (iii) a protocol number, (iv) a Type of Service (TOS) field, (v) a source address, and (vi) a destination address that are contained in the header of the data packet to be distributed by the P-GW 153 to the additional dedicated EPS bearer.

In Step S712, the SCS 16 transmits a QoS change notification to the MTC user 17 as a reply to the QoS change request in Step S702. This notification includes the flow indicator to identify data packets that are transferred through the additional dedicated EPS bearer. Due to the same reason as that described regarding Step S207 in FIG. 7, the notification in Step S712 may be omitted.

In Step S713, the SCS 16 transmits a QoS change notification to the MTC gateway device 11. The notification transmitted in Step S713 indicates an association between the target local device and the newly added dedicated EPS bearer. Accordingly, the MTC gateway device 11 is able to identify the packet flow which should be flowed to the newly added dedicated EPS bearer, so as to appropriately configure the packet filter (Step S714). The notification transmitted in Step S713 includes, for example, the ID of the target local device and the flow indicator.

The processing in Steps S706-S709 shown in FIG. 12 may be similar to the normal procedure specified in the mobile communication network. The method disclosed in §5.4.1 "Dedicated bearer activation" of 3GPP TS 23.401 V11.0.0 may be used, for example.

Figure 13:
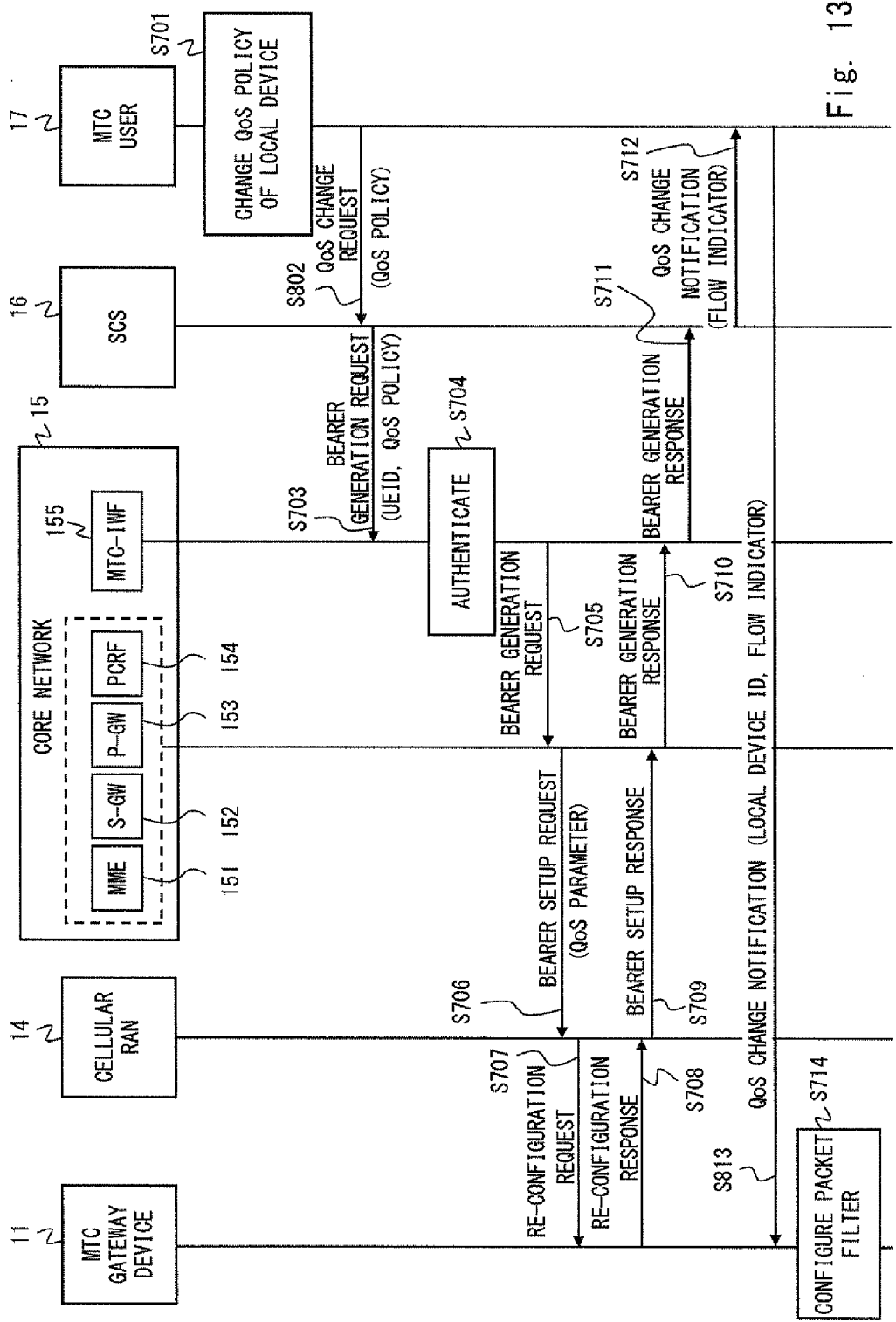
FIG. 13 is a sequence diagram showing a second example of the procedure for configuring the additional bearer in the mobile communication network according to the fourth embodiment.

FIG. 13 shows a second example of the procedure for configuring the additional bearer in the mobile communication network according to this embodiment. A QoS change request transmitted in Step S802 in FIG. 13 includes indication of the new QoS policy. In Step S813, the QoS change notification is transmitted to the MTC gateway device 11 from the MTC user 17, not from the SCS 16. The processing in other Steps S701, S703-S712, and S714 shown in FIG. 13 may be similar to the processing in the same steps shown in FIG. 12.

Figure 14:
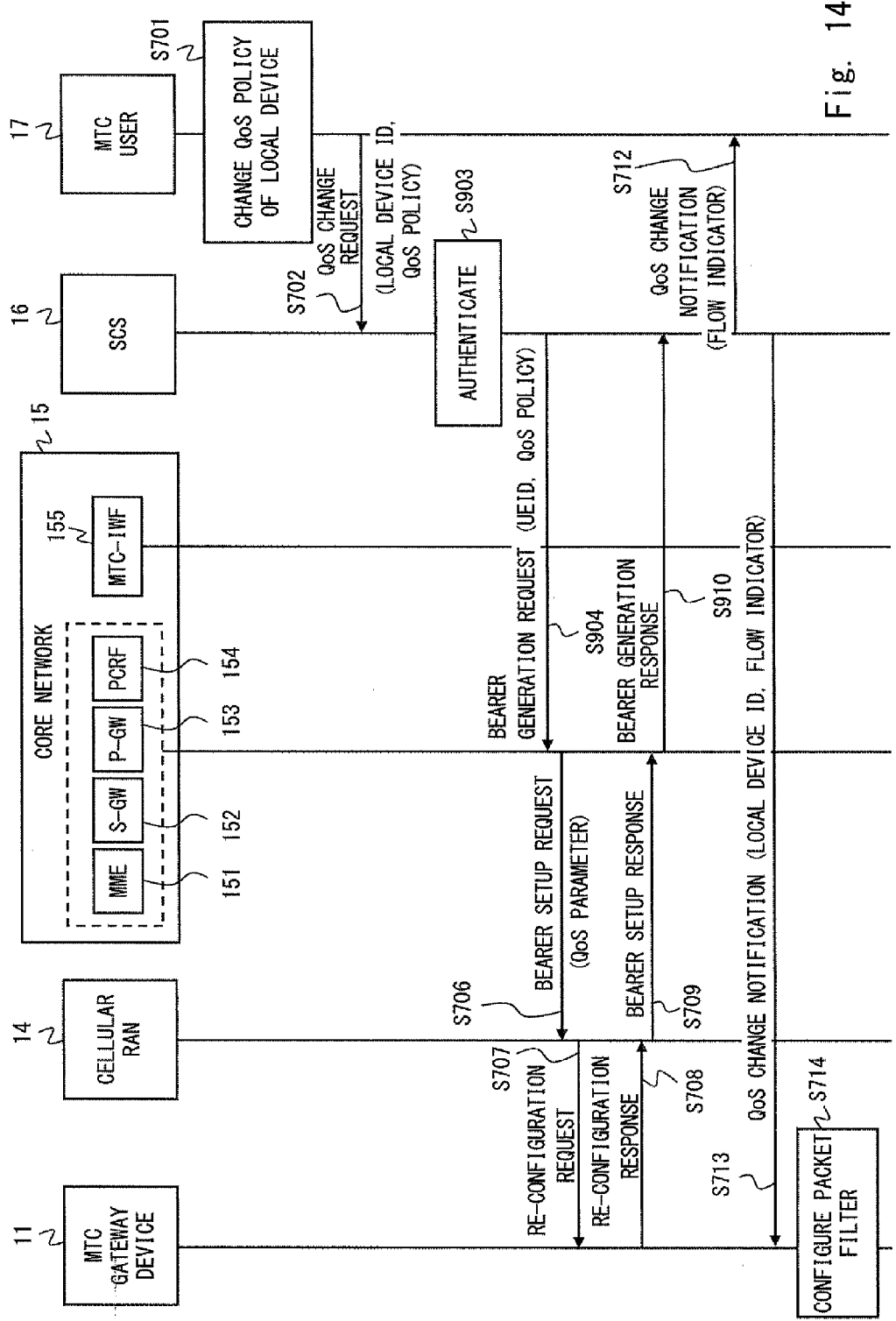
FIG. 14 is a sequence diagram showing a third example of the procedure for configuring the additional bearer in the mobile communication network according to the fourth embodiment.

FIG. 14 shows a third example of the procedure for configuring the additional bearer in the mobile communication network according to this embodiment. The first example (FIG. 12) shows the example in which the MTC-IWF 155 performs authentication regarding the additional bearer configuration authority (S704). However, the authentication function may be included in the SCS 16. Further, in the direct model and the hybrid model, the SCS 16 is able to communicate with the P-GW 153 that manages bearer end points. Accordingly, the SCS 16 may transmit the bearer generation request directly to the P-GW 153 without the intervention of the MTC-IWF 155. FIG. 14 therefore shows the procedure for generating the additional bearer by the signaling without the intervention of the MTC-IWF 155.

The processing in Steps S701 and S702 in FIG. 14 is similar to the processing in the corresponding steps shown in FIG. 12. In Step S903, the SCS 16 (the controller 160) determines whether an additional bearer is required according to the QoS change request from the MTC user 17. Further, the SCS 16 authenticates whether the MTC user 17 is authorized to request an additional bearer configuration. The SCS 16 may perform the authentication in collaboration with another node (e.g., a policy server or the PCRF 154). The communication between the SCS 16 and the policy server or the like may be performed through the MTC-IWF 155.

When it is determined that the additional bearer is required and it is authenticated that the MTC user 17 has proper authority, the SCS 16 transmits the bearer generation request to the core network 15 (Step S904). The SCS 16 may transmit the bearer generation request to, for example, the P-GW 153 that manages bearer end points. The bearer generation request includes an identifier (UEID) of the MTC gateway device 11 as a mobile station and indication of the QoS policy in the MTC application layer.

The processing in Steps S706-S709 in FIG. 14 is similar to the processing in the corresponding steps shown in FIG. 12. In Step S910, the SCS 16 (the controller 160) receives the bearer generation response transmitted from the core network 15 (e.g., the P-GW 153) as a reply to the bearer generation request in Step S904. The processing in Steps S712-S713 in FIG. 14 is similar to the processing in the corresponding steps shown in FIG. 12.

Figure 15:
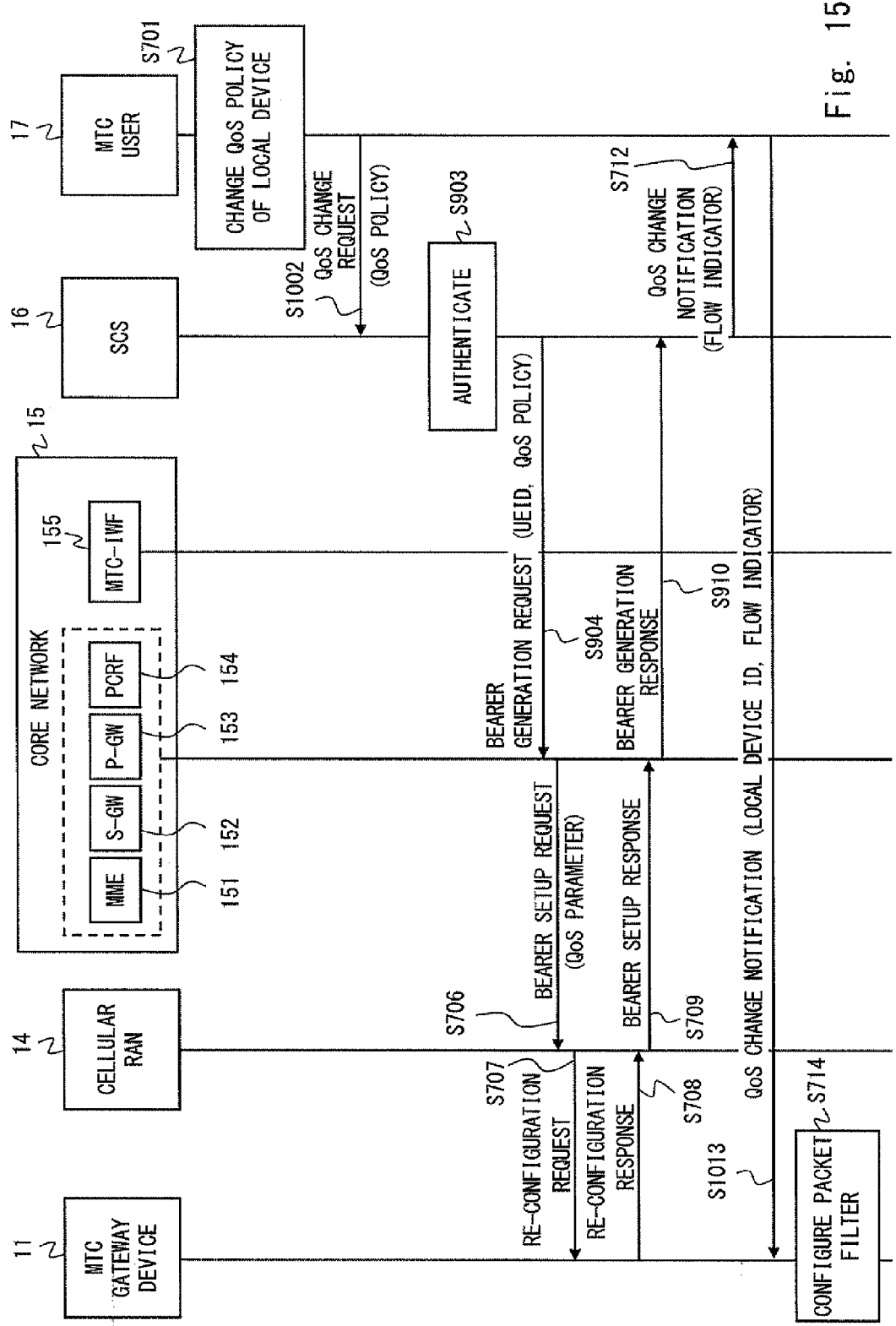
FIG. 15 is a sequence diagram showing a fourth example of the procedure for configuring the additional bearer in the mobile communication network according to the fourth embodiment.

FIG. 15 shows a fourth example of the procedure for configuring the additional bearer in the mobile communication network according to this embodiment. The procedure shown in FIG. 15 is a variation of the procedure shown in FIG. 14. The QoS change request transmitted in Step S1002 in FIG. 15 includes indication of the new QoS policy. In Step S1013, the QoS change notification is transmitted to the MTC gateway device 11 from the MTC user 17, not from the SCS 16. The processing in other steps in FIG. 15 may be similar to the processing in the corresponding steps shown in FIG. 14.

As described above, the mobile communication network according to this embodiment is configured so that the core network 15 prepares a bearer in response to the request from the MTC user 17 due to the change of the QoS policy in the MTC application layer. In the MTC services, as is different from the human-to-human (H2H) services, it is expected that there are many cases in which the MTC user (or the MTC application server, the M2M service platform) 17 has strong authority of administration. This is because in many cases, the MTC device, the local device, and the MTC gateway device are targets to be monitored by the MTC user. Accordingly, it is preferable that, in the MTC services, the core network 15 is able to generate an additional bearer in response to the request from the MTC user 17, not from the MTC device (i.e., the MTC gateway device 11 and the local device 12). According to this embodiment, the core network 15 is able to generate the additional bearer in response to the request from the MTC user 17.

Fifth Embodiment

Shown in the first to fourth embodiments are the specific examples in which the additional bearer used for transferring packets of the target local device is generated by executing the procedure for adding a bearer (dedicated bearer) to the existing PDN connection. However, the additional bearer may be generated by the generation of new PDN connection, not by the addition of a bearer to the existing PDN connection. For example, 3GPP Release 8 and higher, which are related to the EPS, define a procedure for configuring a new PDN connection in addition to the existing PDN connection at the initiative of a mobile station. The additional bearer may be therefore generated using this procedure. Further, the additional bearer may be generated by generating the new PDN connection at the initiative of the core network 15 in response to the request from the MTC user 17 or the SCS 16.

Figure 16:
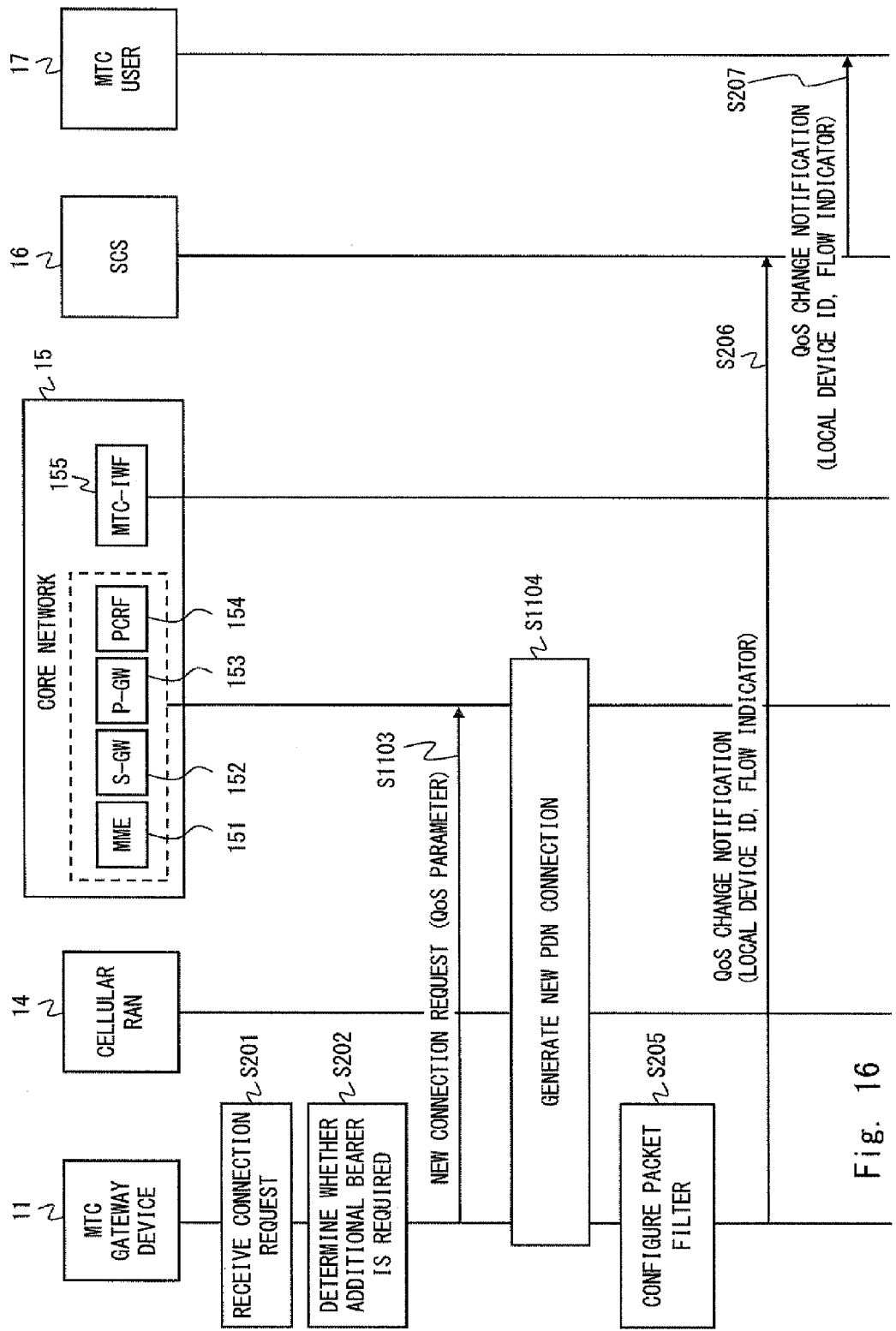
FIG. 16 is a sequence diagram showing a first example of a procedure for configuring an additional bearer in a mobile communication network according to a fifth embodiment.

The sequence diagram shown in FIG. 16 shows a specific example of generating the additional bearer using the procedure for generating the new PDN connection based on the request from the MTC gateway device 11 as a mobile station. FIG. 16 is a variation of FIG. 7. The processing in Steps S201-S202 and S205-S207 in FIG. 16 may be similar to the processing in the corresponding steps shown in FIG. 7.

In Step S1103 shown in FIG. 16, the MTC gateway device 11 transmits a request for generation of a new PDN connection to the core network 15. The request for generation of a new PDN connection may be a non-access stratum (NAS) message that is transparently transferred to the control node (i.e., the MME 151) in the core network from the MTC gateway device 11 as a mobile station. For example, the request for generation of a new PDN connection may be a PDN Connectivity Request message specified in §5.10.2 "UE requested PDN connectivity" of 3GPP TS 23.401 V11.0.0.

In Step S1104, in response to the request for generation of a new PDN connection, the core network 15, the cellular RAN 14, and the MTC gateway device 11 perform signaling regarding the generation procedure of the new PDN connection. This signaling is specified, for example, in §5.10.2 "UE requested PDN connectivity" of 3GPP TS 23.401 V11.0.0. Accordingly, the new PDN connection including the additional EPS bearer is configured between the MTC gateway device 11 and the core network 15, more specifically, between the MTC gateway device 11 and the P-GW 153 that is associated with the SCS 16.

Figure 17:
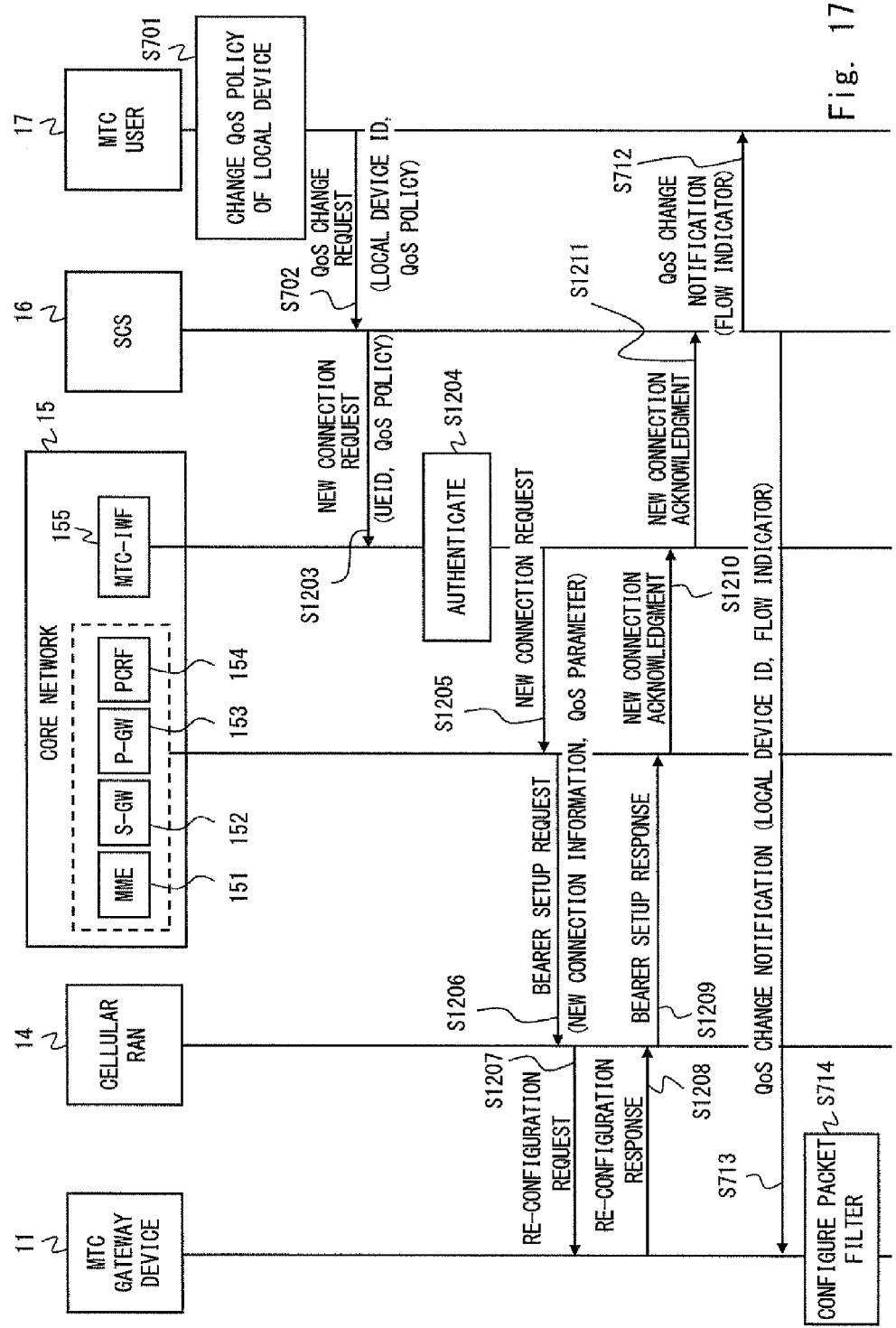
FIG. 17 is a sequence diagram showing a second example of the procedure for configuring the additional bearer in the mobile communication network according to the fifth embodiment.

Meanwhile, the sequence diagram shown in FIG. 17 shows a specific example of a procedure for generating a new PDN connection at the initiative of the core network 15 in response to the request from the MTC user 17 or the SCS 16. FIG. 17 is a variation of FIG. 12. In summary, in the example shown in FIG. 17, the MTC-IWF 155 performs authentication regarding the authority to establish the new connection. The processing in Steps S701, S702, and S712-S714 in FIG. 17 may be similar to the processing in the corresponding steps shown in FIG. 12.

In Step S1203 shown in FIG. 17, the SCS 16 transmits a new connection request to the MTC-IWF 155. The new connection request requests the core network 15 to generate a new PDN connection. The new connection request includes indication of the QoS policy in the MTC application layer and an identifier (UEID) of the MTC gateway device 11 as a mobile station. The new connection request may include a QoS parameter (e.g., a QCI, an ARP, a GBR, or a MBR) of an EPS bearer corresponding to the QoS policy in place of the QoS policy in the application layer.

The MTC-IWF 155 authenticates whether the SCS 16 is authorized to request a new connection establishment (Step S1204). When the SCS 16 is authorized to request a new connection establishment, the MTC-IWF 155 transfers a new connection request to the node of the core network 15 (Step S1205). The MTC-IWF 155 may transmit a new connection request to, for example, the P-GW 153 that manages bearer end points. The P-GW 153 of the core network 15 transmits the new connection request transmitted from the SCS 16 to the MME 151 directly or through the S-GW 152. The MME 151 signals with the S-GW 152 and the P-GW 153 to generate a bearer of a new PDN connection. More specifically, the MME 151 may transmit a session generation request (a Create Session Request) to the S-GW 152 in a similar way as the procedure specified in §5.10.2 "UE requested PDN connectivity" of 3GPP TS 23.401 V11.0.0.

In Step S1206, the core network 15 (e.g., the MME 151) transmits a bearer setup request to the cellular RAN 14. The bearer setup request may include, as the information transmitted to the UE, information regarding a new PDN connection, and session management information including QoS parameters of the EPS bearer and packet filter configuration (e.g., a TFT). The information regarding the new PDN connection includes, for example, the APN of the new PDN connection, the PDN type (i.e., IPv4 or IPv6), the PDN address given to the MTC gateway device 11 (i.e., an IP address). More specifically, the bearer setup request may include the message similar to a PDN Connectivity Accept message specified in §5.10.2 "UE requested PDN connectivity" of 3GPP TS 23.401 V11.0.0.

In Step S1207, a radio resource management entity (e.g., an eNB) of the cellular RAN 14 transmits a reconfiguration request (e.g., an RRC Connection Reconfiguration message) to the MTC gateway device 11 as a mobile station. The reconfiguration request includes information regarding a new PDN connection notified from the core network 15 (e.g., the MME 151). The MTC gateway device 11 performs radio bearer configuration and IP address configuration regarding a new PDN connection according to the reconfiguration request, and adjusts a packet filter (e.g., a TFT) to map the data packet flow to the bearer of the new PDN connection.

In Steps S1208-S1210 and S1211, responses to the requests transmitted in Steps S1203 and S1205-S1207 are transmitted. More specifically, in Step S1211, the SCS 16 (controller 160) receives a new connection acknowledgment message transmitted from the core network 15 (e.g., the MTC-IWF 155) as a reply to the new connection request transmitted in Step S1203. This acknowledgment message includes a flow indicator to identify data packets that are transferred through the EPS bearer of the newly added PDN connection. The flow indicator includes, for example, at least one of (i) a bearer identifier, (ii) a port number, (iii) a protocol number, (iv) a Type of Service (TOS) field, (v) a source address, and (vi) a destination address that are contained in the header of the data packet to be distributed by the P-GW 153 to the additional dedicated EPS bearer.

Further, FIG. 18 shows a sequence diagram of another example of generating a new PDN connection at the initiative of the core network 15 in response to the request from the MTC user 17 or the SCS 16. FIG. 18 is a variation of FIG. 14. That is, in the example shown in FIG. 18, the SCS 16 performs authentication regarding the authority to establish the new connection. The processing in Steps S701, S702, and S712-S714 shown in FIG. 18 may be similar to the processing in the corresponding steps shown in FIG. 14.

In Step S1303 shown in FIG. 18, the SCS 16 (the controller 160) determines whether the additional bearer is required according to the QoS change request from the MTC user 17. Further, the SCS 16 authenticates whether the MTC user 17 is authorized to request a new connection. The SCS 16 may perform the authentication in collaboration with another node (e.g., a policy server or the PCRF 154). The communication between the SCS 16 and the policy server or the like may be performed through the MTC-IWF 155.

When it is determined that the additional bearer is required and it is authorized that the MTC user 17 has authority to request a new connection, the SCS 16 transmits a new connection request to the core network 15 (Step S1304). The SCS 16 may transmit the new connection request to, for example, the P-GW 153 that manages bearer end points. The new connection request includes indication of the QoS policy in the MTC application layer and an identifier (UEID) of the MTC gateway device 11 as a mobile station.

The processing in Steps S1206-S1209 in FIG. 18 is similar to the processing in the corresponding steps shown in FIG. 17. In Step S1310, the SCS 16 (the controller 160) receives a new connection acknowledgment message transmitted from the core network 15 (e.g., the P-GW 153) as a reply to the new connection request in Step S1304.

The example of generating a new PDN connection in addition to the existing PDN connection described in this embodiment is efficient when communication regarding a PDN type different from the existing PDN connection, i.e., communication regarding different IP version is performed. For example, when the SCS 16 newly starts IPv6 communication with the MTC gateway device 11 that has performed IPv4 communication using an existing IPv4 PDN connection, it is impossible to configure the additional bearer in the existing IPv4 PDN connection. In this case, it is required to newly configure an IPv6 PDN connection in addition to the existing IPv4 PDN connection.

OTHER EMBODIMENTS

In the first to fifth embodiments, the examples of the indirect model or the hybrid model, i.e., the examples in which the SCS 16 is used at least in the control plane have been described. The first to fifth embodiments may also be applied, however, to the direct model which does not use the SCS 16. In this case, the MTC user 17 may directly perform the signaling described in the first to fifth embodiments with the core network 15 (e.g., the P-GW 153).

In the first to fifth embodiments, the controller 110 of the MTC gateway device 11 may manage the QoS policies of the plurality of local devices. The addresses of the local devices 12 in the personal/local area network 13 or other addresses for uniquely differentiating respective local devices 12 (e.g., MAC addresses) may be used for this management. Further, the controller 110 may operate to select one of the bearers to use transmission or reception of data packets each including data which is originated by or destined for each local device 12, according to the QoS policy applied to the each local device 12 in the MTC application layer. The management of the plurality of local devices 12 similar to this may be performed by the controller 160 of the SCS 16 or the controller 170 of the MTC user 17.

The processing performed by the controller 110, the controller 160, the controller 170, and the node of the core network 15 (e.g., the MME 151 and the P-GW 153) described in the first to fifth embodiments may be implemented by using a semiconductor processing device including an ASIC (Application Specific Integrated Circuit). Further, these processing may be implemented by causing a system including at least one computer called a microprocessor, a microcontroller, a micro processing unit (MPU) or the like to execute a program. More specifically, one or more programs including instructions for causing a computer system to perform the algorithms described with reference to the flowcharts and sequence diagrams in this specification may be created and supplied to the computer system.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

In the first to fifth embodiments, the network where the MTC gateway device is used has been described. As will be understood from the above description, however, the first to fifth embodiments may be applied to a network in which a mobile router (or a user equipment (UE) having a tethering function) is used. That is, the first to fifth embodiments may be applied to a network including a radio communication apparatus that is connected to at least one local device by means of a personal or local area networking technology.

Furthermore, the present invention is not limited to the embodiments described above, and may be changed in various ways without departing from the spirit of the present invention already stated above.

This application is based upon and claims the benefit of priority from Japanese Patent Application No. 2012-101633, filed on Apr. 26, 2012, the disclosure of which is incorporated herein in its entirety by reference.

REFERENCE SIGNS LIST

11 MTC GATEWAY DEVICE
12 LOCAL DEVICE
13 PERSONAL/LOCAL AREA NETWORK
14 CELLULAR RADIO ACCESS NETWORK
15 CORE NETWORK
16 SERVICES CAPABILITY SERVER (SCS)
17 MTC USER
18 MOBILE OPERATOR DOMAIN
110 CONTROLLER
151 MOBILITY MANAGEMENT ENTITY (MME)
152 SERVING GATEWAY (S-GW)
153 PACKET DATA NETWORK GATEWAY (P-GW)
154 POLICY CHARGING AND RULES FUNCTION (PCRF)
155 MTC INTERWORKING FUNCTION (MTC-IWF)
160 CONTROLLER
170 CONTROLLER

The invention claimed is:

1. A radio communication apparatus that provides a connection with an external network through a core network and a cellular radio access network to at least one local device that is connected to the radio communication apparatus by means of a personal or local area networking technology, the radio communication apparatus comprising a controller, wherein the controller is configured to transmit to the core network an additional bearer generation request to request an additional bearer having a QoS parameter corresponding to a first QoS policy applied to a first device in an application layer, the first device is included in the at least one local device, and the controller is further configured to use the additional bearer, configured between the radio communication apparatus and the core network according to the additional bearer generation request, to transmit or receive data packets each including data which is originated by or destined for the first device, wherein the controller is further configured to transmit the additional bearer generation request in response to reception of a QoS change request indicating a change of a QoS policy applied to the first device from a network node arranged in the external network or at a boundary between the external network and the core network.

2. The radio communication apparatus according to claim 1,
wherein the controller is further configured to transmit the additional bearer generation request when the first QoS policy is different than an existing QoS policy that has already been applied to the at least one local device.

3. The radio communication apparatus according to claim 2, wherein the additional bearer is configured in addition to an existing bearer that transfers data packets associated with the existing QoS policy, and is used to transfer data packets associated with the first QoS policy.

4. The radio communication apparatus according to claim 1,
wherein the controller is further configured to transmit the additional bearer generation request in response to reception of a connection request from the first device.

5. The radio communication apparatus according to claim 4,
wherein the controller is configured to determine whether the additional bearer is required or not based on the first QoS policy in response to the reception of the connection request, and to transmit the additional bearer generation request in response to determination that the additional bearer is required.

6. The radio communication apparatus according to claim 1,
wherein the controller is further configured to determine whether the additional bearer is required or not based on the first QoS policy in response to the reception of the QoS change request and to transmit the additional bearer generation request in response to determination that the additional bearer is required.

7. The radio communication apparatus according to claim 1,
wherein the controller is further configured to transmit, to a network node that is arranged in the external network or at the boundary between the external network and the core network, a notification including identifying information to identify data packets to be transferred through the additional bearer.

8. The radio communication apparatus according to claim 7, wherein the notification comprises an identifier of the first device.

9. The radio communication apparatus according to claim 7, wherein the identifying information indicates at least one of (i) a bearer identifier, (ii) a port number, (iii) a protocol number, (iv) a Type of Service (TOS) field, (v) a source address, and (vi) a destination address that are contained in a header of a data packet to be distributed to the additional bearer.

10. The radio communication apparatus according to claim 1,
wherein the controller is further configured to transmit a notification indicating an association of the additional bearer with the first device to the core network.

11. The radio communication apparatus according to claim 10, wherein the notification comprises an identifier of the additional bearer and an identifier of the first device.

12. The radio communication apparatus according to claim 1,
wherein the controller is further configured to manage a QoS policy applied to each of the at least one local device in an application layer.

13. The radio communication apparatus according to claim 1,
wherein the controller is further configured to select, according to a QoS policy applied to each of the at least one local device in the application layer, a bearer used to transmit or receive data packets each containing data which is originated by or destined for the each of the local devices.

14. The radio communication apparatus according to claim 1, wherein the additional bearer generation request comprises indication of the QoS parameter.

15. The radio communication apparatus according to claim 1, wherein the QoS parameter comprises at least one of a QoS class identifier (QCI), an allocation and retention priority (ARP), a guaranteed bit rate (GBR), and a maximum bit rate (MBR).

16. The radio communication apparatus according to claim 1, wherein the radio communication apparatus is a machine type communication (MTC) gateway device.

17. A method implemented in a radio communication apparatus that provides a connection with an external network through a core network and a cellular radio access network to at least one local device that is connected to the radio communication apparatus by means of a personal or local area networking technology, the method comprising:
transmitting to the core network an additional bearer generation request to request an additional bearer having a QoS parameter corresponding to a first QoS policy applied to a first device in an application layer, the first device being included in the at least one local device; and
using an additional bearer, configured between the radio communication apparatus and the core network according to the additional bearer generation request, to transmit or receive data packets each containing data which is originated by or destined for the first device, wherein
the transmitting includes transmitting the additional bearer generation request in response to reception of a QoS change request indicating a change of a QoS policy applied to the first device from a network node arranged in the external network or at a boundary between the external network and the core network.

18. A non-transitory computer readable medium storing a program for causing a computer to perform a method implemented in a radio communication apparatus that provides a connection with an external network through a core network and a cellular radio access network to at least one local device that is connected to the radio communication apparatus by means of a personal or local area networking technology, wherein the method comprises:

transmitting to the core network an additional bearer generation request to request an additional bearer having a QoS parameter corresponding to a first QoS policy applied to a first device in an application layer, the first device being included in the at least one local device; and using an additional bearer, configured between the radio communication apparatus and the core network according to the additional bearer generation request, to transmit or receive data packets each containing data which is originated by or destined for the first device, wherein the transmitting includes transmitting the additional bearer generation request in response to reception of a QoS change request indicating a change of a QoS policy applied to the first device from a network node arranged in the external network or at a boundary between the external network and the core network.

\* \* \* \* \*